(12) United States Patent
Kim et al.

(10) Patent No.: US 11,036,257 B2
(45) Date of Patent: Jun. 15, 2021

(54) ELECTRONIC DEVICE AND METHOD FOR CONTROLLING DISPLAY

(71) Applicant: Samsung Electronics Co., Ltd, Suwon-si (KR)

(72) Inventors: Joon-Hwan Kim, Yongin-si (KR); Jeong-Won Ko, Seoul (KR); Mun-Hwi Kim, Suwon-si (KR); Hye-Jin Kim, Seoul (KR); Kyung-Wook Ro, Seoul (KR); Myoung-Soo Park, Hwaseong-si (KR); Jung-Woo Shin, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/326,658

(22) PCT Filed: Aug. 21, 2017

(86) PCT No.: PCT/KR2017/009105
§ 371 (c)(1),
(2) Date: Feb. 19, 2019

(87) PCT Pub. No.: WO2018/034555
PCT Pub. Date: Feb. 22, 2018

(65) Prior Publication Data
US 2020/0310492 A1 Oct. 1, 2020

(30) Foreign Application Priority Data
Aug. 19, 2016 (KR) .......... 10-2016-0105368

(51) Int. Cl.
*G06F 1/16* (2006.01)
*G06F 3/0488* (2013.01)
*H04M 1/02* (2006.01)

(52) U.S. Cl.
CPC .......... *G06F 1/1641* (2013.01); *G06F 1/1652* (2013.01); *G06F 1/1677* (2013.01); *G06F 3/04886* (2013.01); *H04M 1/0214* (2013.01)

(58) Field of Classification Search
CPC .... G06F 1/1641; G06F 1/1652; G06F 1/1677; G06F 3/04886; G06F 2203/04803
See application file for complete search history.

(56) References Cited

U.S. PATENT DOCUMENTS 8,988,381 B1  3/2015 Kim et al.
9,959,030 B2 *  5/2018 Sang .................... G06F 1/3206
(Continued)

FOREIGN PATENT DOCUMENTS

EP        2998851 A1    3/2016
KR    10-2015-0096172 A  8/2015
(Continued)

OTHER PUBLICATIONS

Supplementary European Search Report dated Jul. 11, 2019 in connection with European Patent Application No. 17 84 1737, 12 pages.
(Continued)

*Primary Examiner* — Sardis F Azongha

(57) ABSTRACT

The present invention relates to a flexible electronic device, and to an electronic device and method for controlling a display. To this end, according to the present invention, the electronic device for controlling a display can comprise: a display configured to display a first application on a first area; and a processor, which detects a change in the form of the display, and is set to display, in response to the detection and on a second area of the display, a second application paired with the first application displayed on the first area.

14 Claims, 20 Drawing Sheets

(56) References Cited

U.S. PATENT DOCUMENTS

| | | |
|---|---|---|
| 2013/0135182 A1* | 5/2013 | Jung .................... G06F 3/0487 345/30 |
| 2013/0293453 A1 | 11/2013 | Hwang |
| 2014/0049464 A1 | 2/2014 | Kwak et al. |
| 2014/0340299 A1 | 11/2014 | Lee et al. |
| 2015/0338888 A1 | 11/2015 | Kim et al. |
| 2016/0042496 A1 | 2/2016 | Ichimi et al. |
| 2016/0085319 A1 | 3/2016 | Kim et al. |
| 2016/0098063 A1 | 4/2016 | Lee et al. |
| 2016/0179236 A1 | 6/2016 | Shin et al. |

FOREIGN PATENT DOCUMENTS

| | | |
|---|---|---|
| KR | 10-2016-0019369 A | 2/2016 |
| KR | 10-2016-0032079 A | 3/2016 |
| KR | 10-2016-0033507 A | 3/2016 |
| KR | 10-2016-0040909 A | 4/2016 |
| KR | 10-2016-0080467 A | 7/2016 |
| WO | 2016/052814 A1 | 4/2016 |

OTHER PUBLICATIONS

International Search Report dated Nov. 22, 2017 in connection with International Patent Application No. PCT/KR2017/009105, 2 pages.
Written Opinion of the International Searching Authority dated Nov. 22, 2017 in connection with International Patent Application No. PCT/KR2017/009105, 7 pages.

* cited by examiner

ELECTRONIC DEVICE AND METHOD FOR CONTROLLING DISPLAY

CROSS-REFERENCE TO RELATED APPLICATIONS

This application is a 371 of International Application No. PCT/KR2017/009105 filed on Aug. 21, 2017, which claims priority to Korean Patent Application No. 10-2016-0105368 filed on Aug. 19, 2016, the disclosures of which are herein incorporated by reference in their entirety.

BACKGROUND

1. Field

The present disclosure relates to a flexible electronic device and, more particularly, to an electronic device and a method for controlling a display.

2. Description of Related Art

Recently, electronic devices have come to provide a wide variety of services and additional functions. In order to raise the utility value of electronic devices and meet the different needs of users, communication service providers and electronic device manufacturers are offering a broader range of functions and are competitively developing electronic devices in order to differentiate their devices from other companies' devices.

In addition, various types of flexible electronic devices are being developed due to the advancement of electronics technologies. In particular, electronic devices, such as TVs, PCs, laptop computers, tablet PCs, mobile phones, and MP3 players, have become widely propagated and thus are being used in most households.

In recent years, efforts have been made to develop electronic devices in a new form in order to meet the needs of users who want new and diverse functions. A flexible electronic device is an electronic device whose shape can be transformed like paper. The shape of a flexible electronic device can be transformed when a user applies force thereto, and may be provided in a folded form.

Conventionally, when a change in the shape of a display (e.g., outspreading of a display) is detected, a predetermined application or a home screen is displayed, which does not match a user's intention.

Accordingly, it is required to display various user interfaces in response to a shape change operation by a user, and it is also required to display an application associated with a previously displayed application in order to improve user satisfaction.

SUMMARY

Various embodiments of the present disclosure provide an electronic device and a method for controlling the display of a display in response to the shape change (e.g., outspreading or folding) of a flexible electronic device.

To this end, according to various embodiments of the present disclosure, an electronic device for controlling a display may include: a display configured to display a first application in a first area; and a processor configured to detect a shape change of the display and to display a second application, which is paired with the first application displayed in the first area, in a second area on the display in response to the detection.

Further, according to various embodiments of the present disclosure, a method for controlling a display by an electronic device may include: displaying a first application in a first area on a display; detecting a shape change of the display; determining a second application, paired with the first application displayed in the first area, in response to the detection; and displaying the determined second application in a second area on the display.

In addition, according to various embodiments of the present disclosure, a computer-readable storage medium may store a program including instructions to control a display of an electronic device, and the instruction may include: a first command set to display a first application in a first area on a display; a second command set to detect a shape change of the display; a third command set to determine a second application, paired with the first application displayed in the first area, in response to the detection; and a fourth command set to display the determined second application in a second area on the display.

According to various embodiments of the present disclosure, when an electronic device and a method for controlling a display are provided, different user interfaces may be displayed according to priorities in a shape change (e.g., outspreading or folding) operation, thereby providing the unique performance of a flexible device to a user. Further, with an already executed application continuously displayed, at least one application paired with the executed application can be displayed, thereby reducing usage inconvenience.

In addition, a secondary screen can be displayed while the at least one application is displayed, thus enabling the user to quickly execute a desired application.

Figure 16:
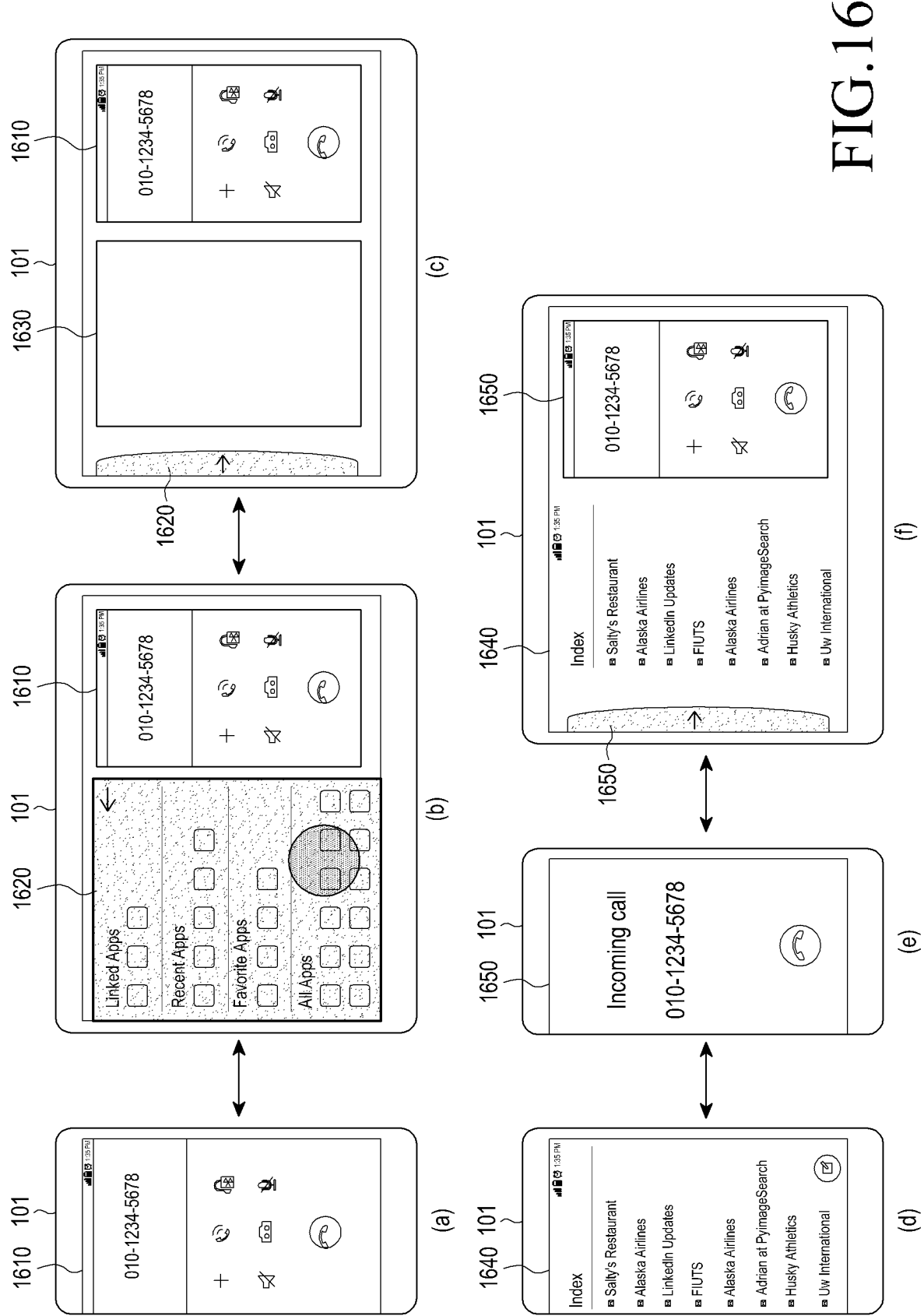
Figure 17:
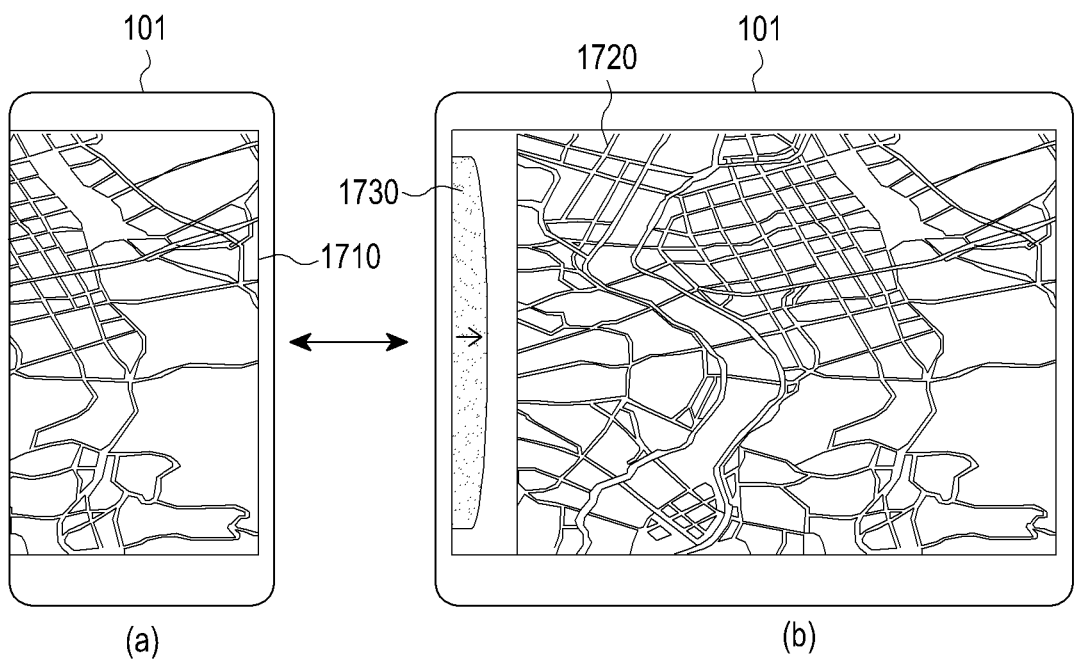
Figure 18:
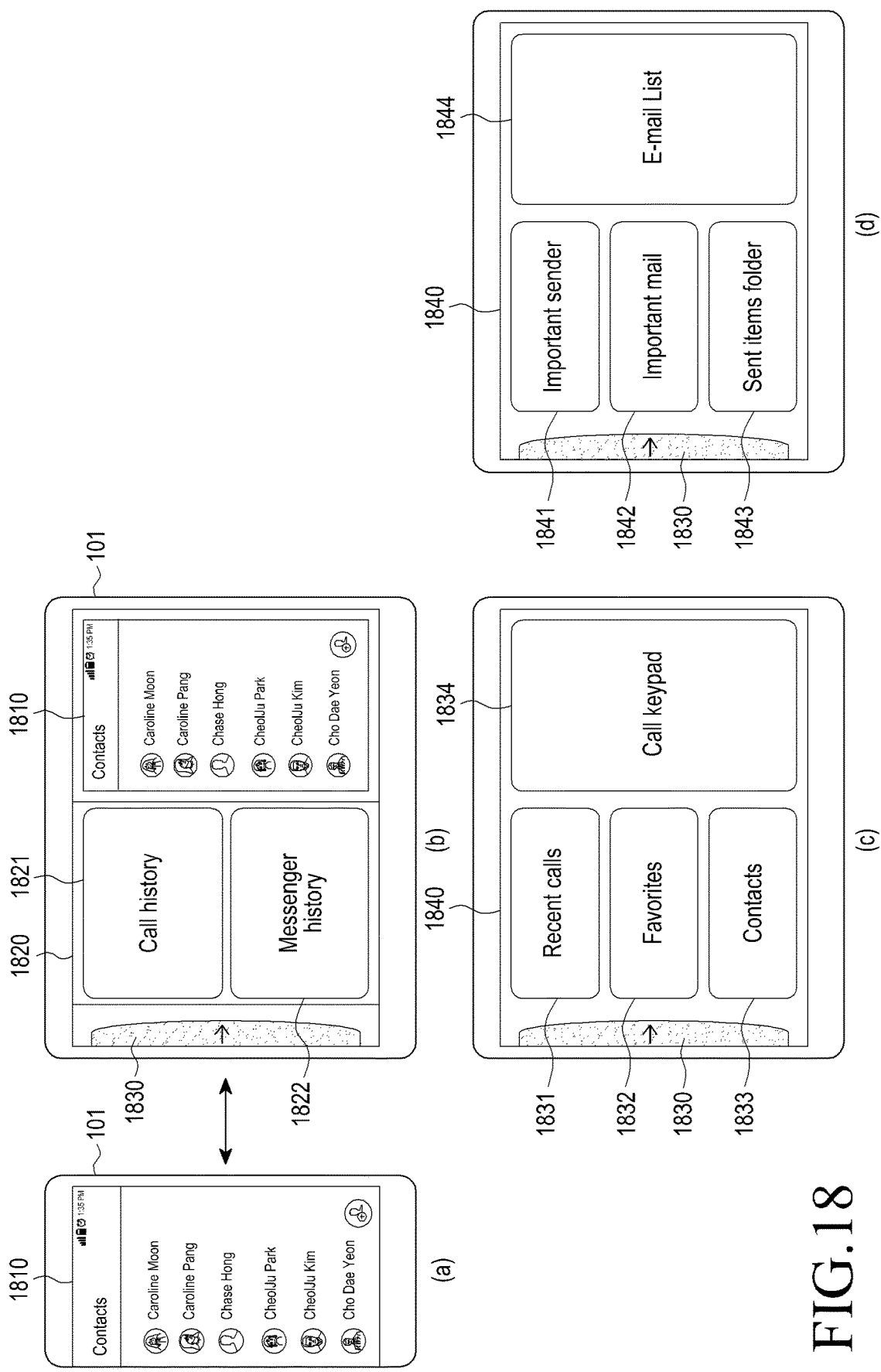
Figure 19A:
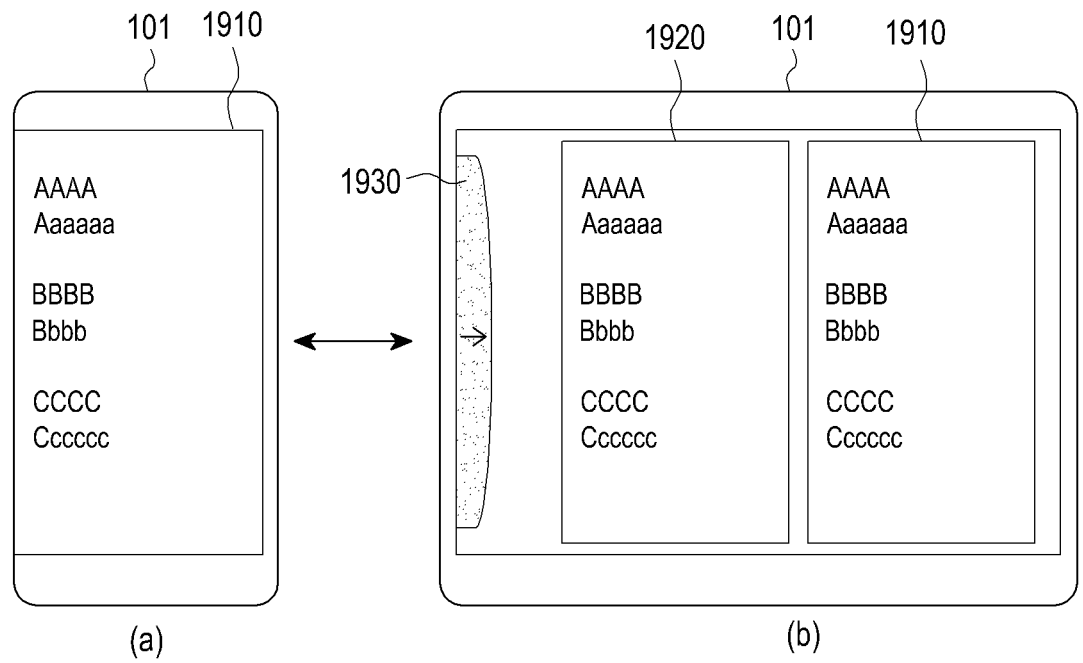
Figure 19A:
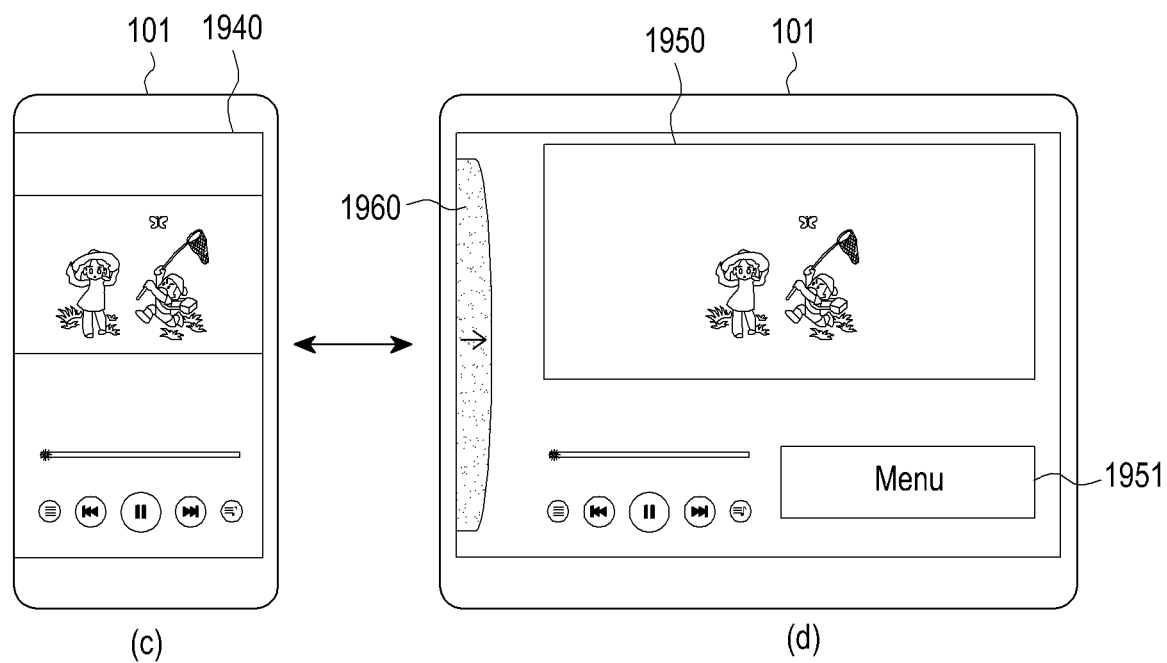
Figure 19B:
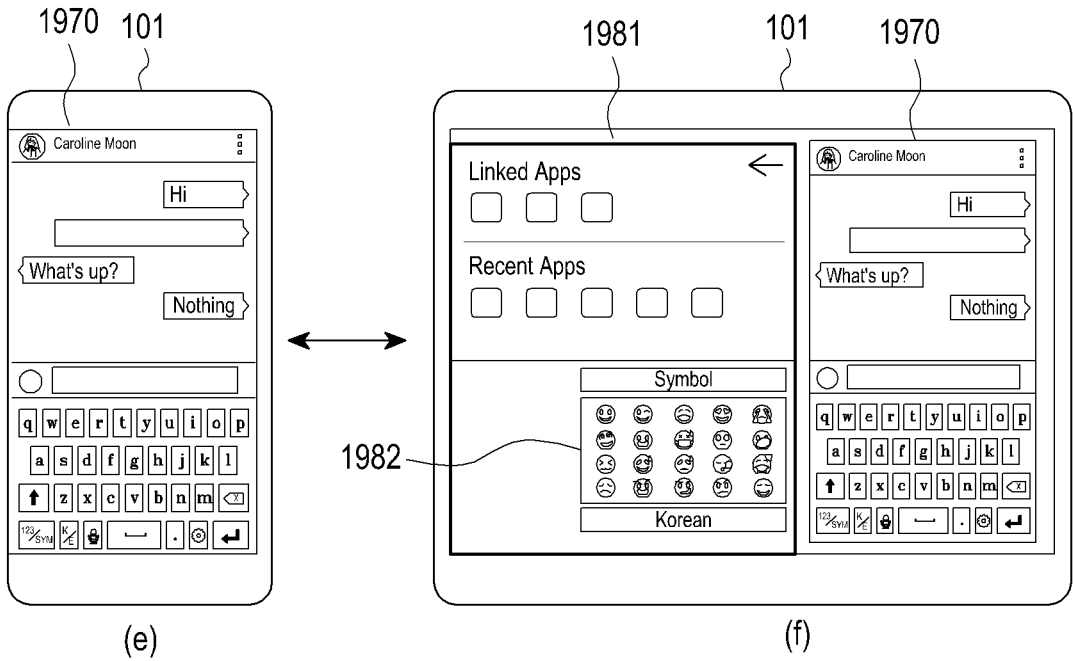
Figure 19B:
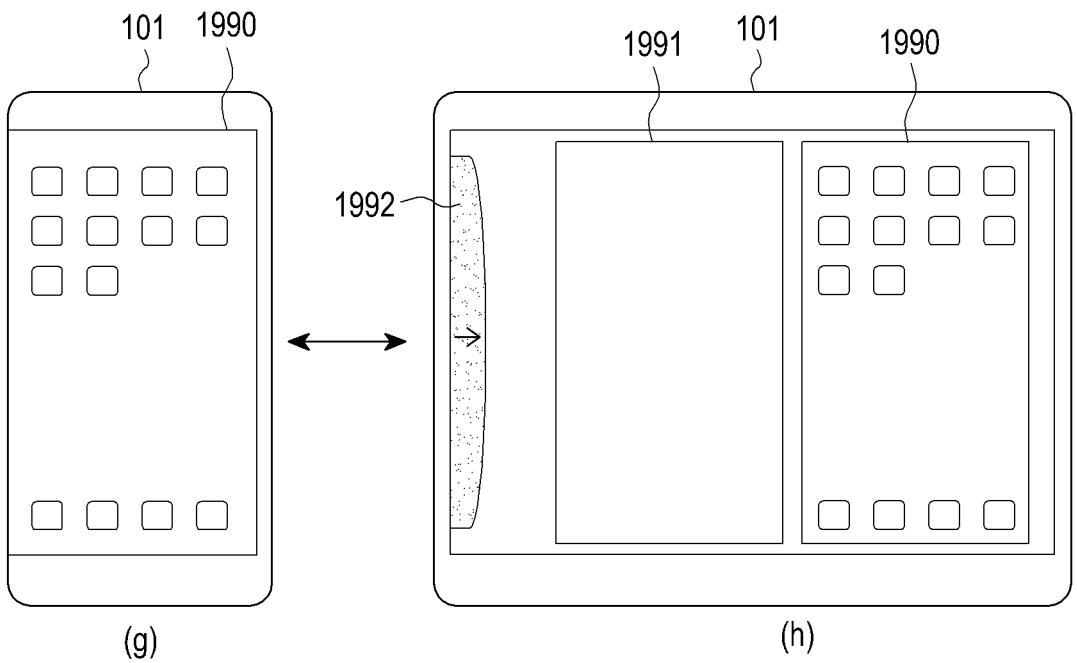

(a) of FIG. 16 to (c) of FIG. 16 illustrate that the display operation of a display is controlled by a shape change with a screen indicating an incoming call displayed in a first area on the display according to a third embodiment of the present disclosure;

(d) of FIG. 16 to (f) of FIG. 16 illustrate that the display operation of a display is controlled by a shape change when there is an incoming call with an email application displayed in the first area on the display according to a fourth embodiment;

FIG. 17 illustrates that the display operation of a display is controlled by a shape change with a map displayed in a first area on the display according to a fifth embodiment of the present disclosure;

FIG. 18 illustrates that the display operation of a display is controlled by a shape change with a contact information application displayed in a first area on the display according to a sixth embodiment of the present disclosure;

(a) of FIG. 19A and (b) of FIG. 19A illustrate that the display operation of a display is controlled by a shape change with a search result displayed by inputting a keyword that a user desires to retrieve through a web browser displayed in a first area on the display according to a seventh embodiment of the present disclosure;

(c) of FIG. 19A and (d) of FIG. 19A illustrate that the display operation of a display is controlled by a shape change with a video played in a first area on the display according to an eighth embodiment of the present disclosure;

(e) of FIG. 19B and (f) of FIG. 19B illustrate that the display operation of a display is controlled by a shape change with a chat application displayed in a first area on the display according to a ninth embodiment of the present disclosure; and (g) of FIG. 19B and (h) of FIG. 19B illustrate that the display operation of a display is controlled by a shape change with a home screen displayed in a first area on the display according to a tenth embodiment of the present disclosure.

DETAILED DESCRIPTION

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 1:
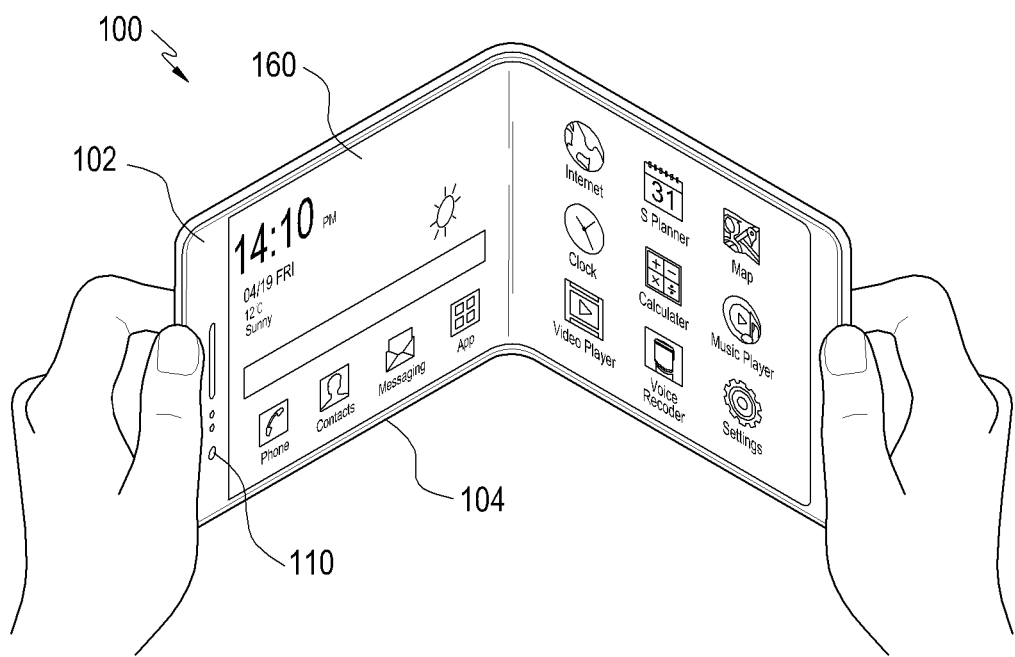
FIG. 1 illustrates an electronic device according to various embodiments of the present disclosure.

FIG. 1 illustrates an electronic device according to various embodiments of the present disclosure.

Referring to FIG. 1, a display 160 may be disposed on a front side 102 of the electronic device 101. The display 160 may be formed large to occupy most of the front side 102 of the electronic device 101. For example, the display 160 may display a main home screen. The main home screen may be a first screen or a Graphical User Interface (GUI) that enables user interaction and is displayed on the display 160 when the electronic device 101 is powered on. The home screen may display at least one of shortcut icons to execute frequently used applications, a main menu switch key, time, and weather. When a user selects the main menu switch key, the display 160 may display a menu screen.

A status bar may be displayed at the top of the display 160 to indicate at least one state of the electronic device 101, such as a battery level, received signal strength, or the current time. A home button, a menu button, and/or a back button may be formed on an edge (referred to as a bezel or a case portion around the display 160) of the front side 102 of the electronic device 101, which is positioned below the display 160.

The home button may be used to display the main home screen on the display. The home button may also be used to display recently used applications or to display a task manager on the display 160. The menu button may be used to provide a link menu that may be displayed on the display 160. The link menu may include at least one of a widget add menu, a background change menu, a search menu, an edit menu, and a configuration menu. The back button may be used to display the screen that was executed immediately before the currently running screen or to terminate the most recently used application.

A first camera 110 and/or at least one sensor, such as a distance sensor, an illumination sensor, and a proximity sensor, may be disposed on an edge of the front side 102 of the electronic device 101, which is positioned above the display 160. A second camera 310, a flash, a speaker, and/or at least one sensor, such as a distance sensor, may be disposed on a rear side 330 of the electronic device 101.

At least one of a power/lock button, a volume button having a volume-up button and a volume-down button, a terrestrial DMB antenna for broadcast reception, and at least one microphone may be disposed on a lateral side 104 of the electronic device 101.

The electronic device 101 may sense an input to change the shape of the display 160. The electronic device 101 may sense an input of outspreading the display 160 or of folding the display 160 and may control the display operation of the display 160 in response to the sensed input. Outspreading the display 160 refers to an operation of moving a second area, disposed under a first area, to be aligned with the second area from the state in which the display 160 is folded into the first area and the second area. Further, folding the display 160 refers to an operation of moving the second area so as to overlap the first area from the state in which the first area and the second area of the display 160 are aligned with each other. The display may face outside with the first area and the second area folded.

Figure 2:
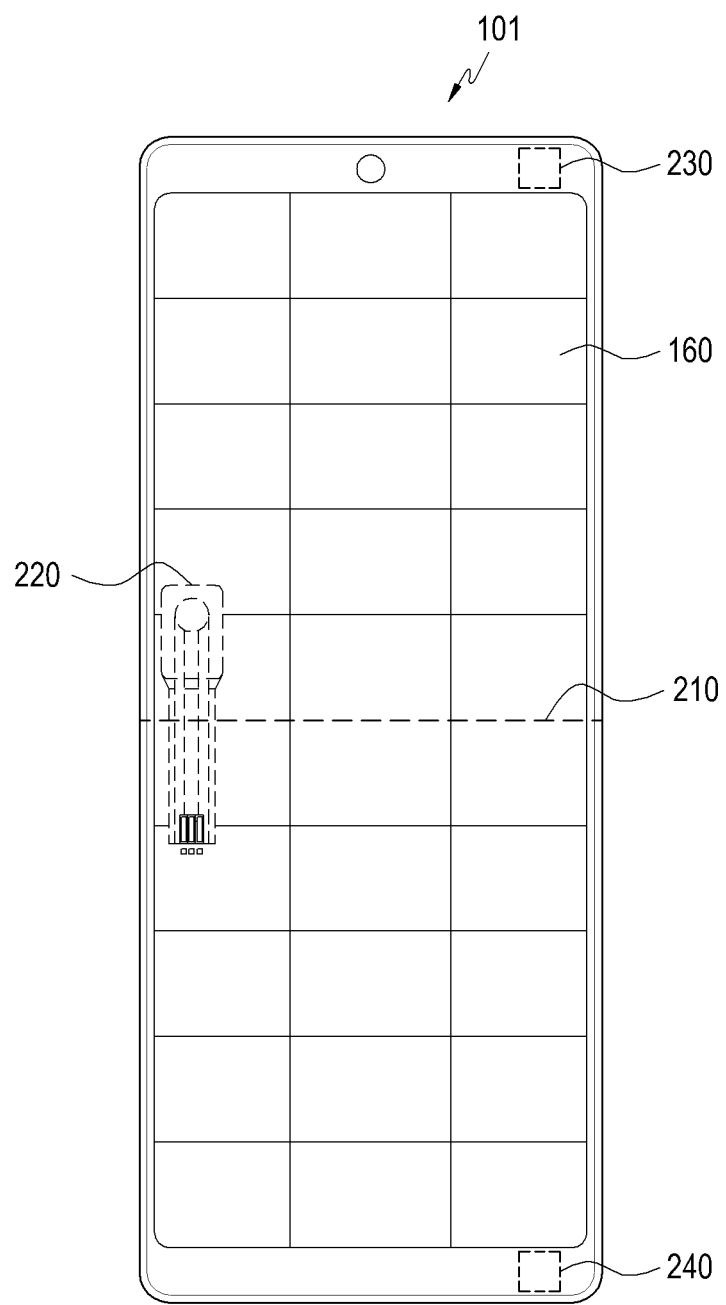
FIG. 2 illustrates an example of a front side of an electronic device according to various embodiments of the present disclosure.

FIG. 2 illustrates an example of a front side of an electronic device according to various embodiments of the present disclosure.

Referring to FIG. 2, the electronic device 101 may include a strain sensor 220 (e.g., a strain gauge), a first sensor 230, a second sensor 240, and a display 160. In addition, the electronic device 101 may include a hinge (not shown) for outspreading and/or folding operations and may further include a circuit board (not shown) to control the display operation of the display 160 in response to an input of the outspreading and/or folding operations. The display operation of the display 160, which can be performed by the circuit board, may be performed by a processor 420.

The strain sensor 220 may be disposed at a folding position 210 of the electronic device 101 and may output a strain value used to measure the folding angle of the electronic device 101.

The electronic device 101 may measure the folding angle of the electronic device 101 or the hinge through an angle sensor 442 that is capable of measuring the folding angle of the display 160.

The first sensor 230 may be disposed on the upper edge of the front side of the display 160, and the second sensor 240 may be disposed on the lower edge of the front side of the display 160. The first and second sensors 230 and 240 may detect a change in the folding state of the electronic device 101. For example, the first and second sensors 230 and 240 may each include at least one of a distance sensor and a gyroscope sensor. Alternatively, the first sensor 230 may be a magnetic-force-sensing sensor, and the second sensor 240 may be a magnetic-force-applying sensor. For example, when the electronic device 101 is bent, the distance between the first sensor 230, which is the magnetic-force-sensing sensor, and the second sensor 240, which is the magnetic-force-applying sensor, is reduced, and accordingly the magnetic-force-sensing sensor may detect the strength of the magnetic force applied by the magnetic-force-applying sensor. As the distance between the magnetic-force-sensing sensor and the magnetic-force-applying sensor is reduced, the strength of the magnetic force changes. Thus, the electronic device 101 may calculate the folding angle based on the strength of the magnetic force.

The display 160 may include a flexible panel for displaying an image, and may detect at least one of pressure and a fingerprint or may include a sensor for detecting pressure and a fingerprint.

Figure 3:
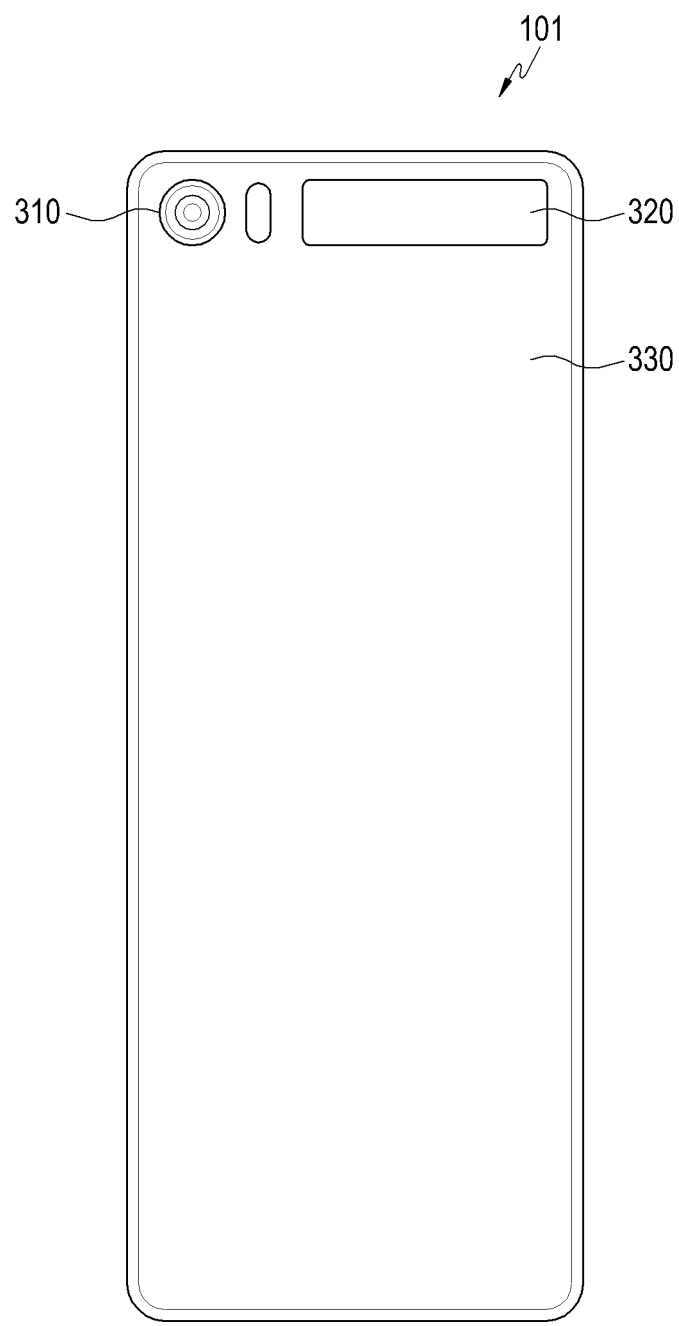
FIG. 3 illustrates an example of a rear side of an electronic device according to various embodiments of the present disclosure.

FIG. 3 illustrates an example of a rear side of an electronic device according to various embodiments of the present disclosure.

Referring to FIG. 3, a sub-display 320, a second camera 310, a flash, a speaker, and/or at least one sensor, such as a distance sensor, may be disposed on the rear side 330 of the electronic device 101.

The electronic device 101 may be configured to display a graphic element/interface/information of a preset condition/type (e.g., message reception/transmission information or state information on the electronic device) on the sub-display 320 in a folded state. The sub-display 320 may be configured to detect pressure (e.g., a user's tap/knock). For example, when the user knocks (e.g., double-knocks/taps) the sub-display 320, the electronic device 101 may be configured to display a graphic element/interface/information on the sub-display 320. The sub-display 320 may be configured to detect fingerprint information.

Figure 4:
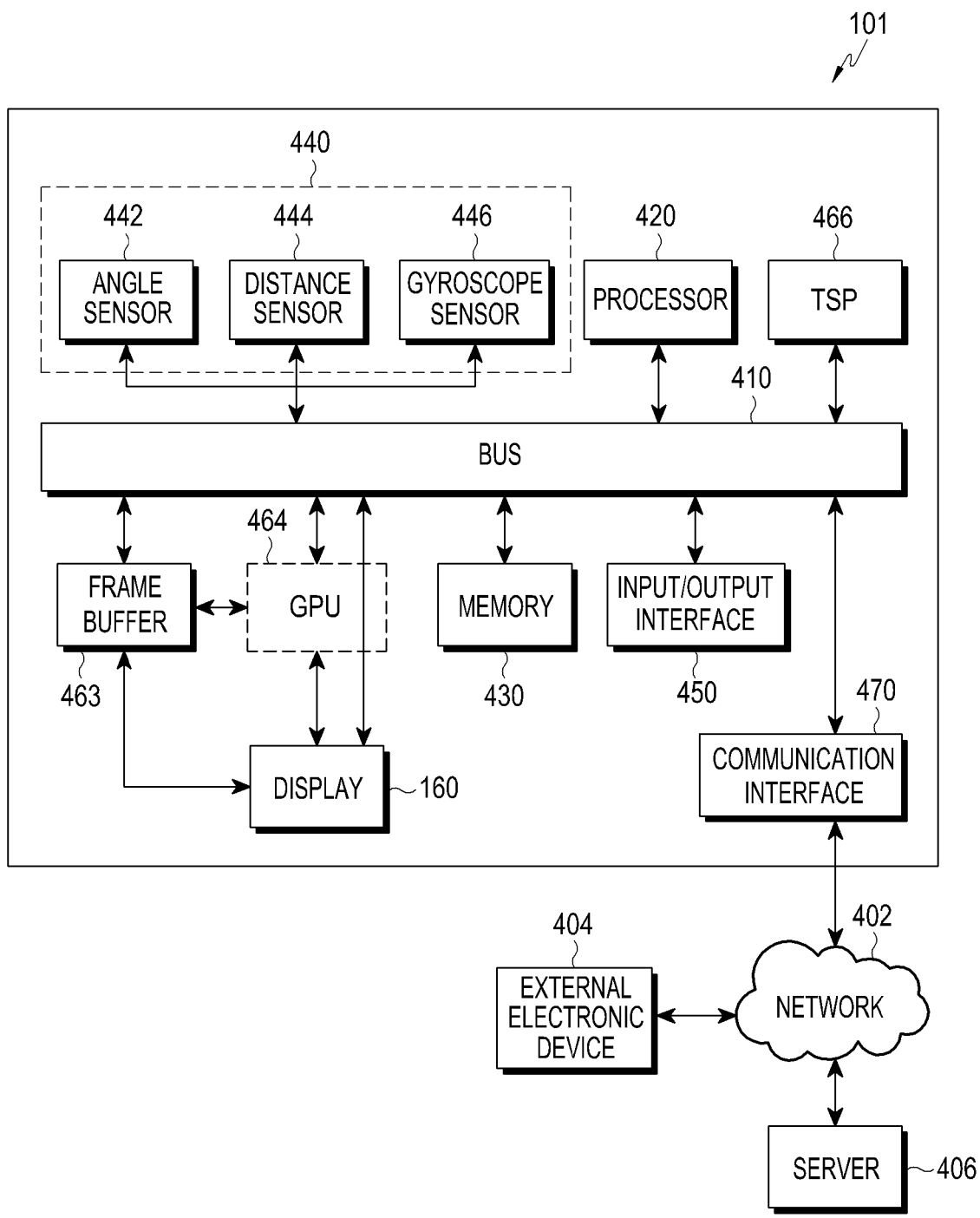
FIG. 4 illustrates an electronic device in a network environment according to various embodiments of the present disclosure.

FIG. 4 illustrates an electronic device in a network environment according to various embodiments of the present disclosure.

Referring to FIG. 4, the electronic device 101 in the network environment according to various embodiments is described. The electronic device 101 may include a bus 410, a processor 420, a memory 430, a sensor module (or sensor unit) 440, an input/output interface 450, a display 160 (e.g., the display 160), and a communication interface 470. In some embodiments, at least one of the components may be omitted, or additional components may be further included in the electronic device 101. For example, the electronic device 101 may further include at least one of a frame buffer 463, a Graphics Processing Unit (GPU) 464, and a Touch Screen Panel (TSP) 466 (also referred to as a touch panel).

The bus 410 may include a circuit that connects the components 410 to 470 to each other and delivers communications (e.g., control messages or data) between the components. The processor 420 may include one or more of a central processing unit, an application processor, and a Communication Processor (CP). The processor 420 may control, for example, at least one different component of the electronic device 101, and/or may perform operations relating to communication or data processing.

The memory 430 may include volatile and/or nonvolatile memory. The memory 430 may store, for example, a command or data related to at least one different component of the electronic device 101. According to one embodiment, the memory 430 may store software and/or a program. The program may include, for example, a kernel, middleware, an Application Programming Interface (API), and/or an application (or "app"). At least part of the kernel, the middleware, and the API may be designated as an operating system. The kernel may control or manage system resources (e.g., the bus 410, the processor 420, the memory 430, or the like) used to perform an operation or function implemented in other programs (e.g., the middleware, the API, or the application). Further, the kernel may provide an interface that allows the middleware, the API, or the application to access individual components of the electronic device 101 to thereby control or manage system resources.

The middleware may serve as a relay so that, for example, the API or the application communicates with the kernel to exchange data. Further, the middleware may process one or more requests for operations received from the application according to the priority thereof. For example, the middleware may assign at least one application priority for using system resources of the electronic device 101 (e.g., the bus 410, the processor 420, the memory 430, or the like) and may process the one or more requests for operations. The API is an interface for the application to control a function provided from the kernel or the middleware, and may include, for example, at least one interface or function (e.g., a command) for file control, window control, image processing, or text control.

The sensor module 440 may measure, for example, physical quantities, or may detect the state of operation of the electronic device 101 and convert measured or detected information into an electrical signal. The sensor module 440 may include, for example, at least one of an angle sensor 442, a distance sensor 444, and a gyroscope sensor 446. The sensor module 440 may include at least one of a Global Navigation Satellite System (GNSS), a Global Positioning System (GPS), a gesture sensor, a barometric pressure sensor, a magnetic sensor, an accelerometer, a grip sensor, a proximity sensor, a color sensor (e.g., a red, green, and blue (RGB) sensor), a biometric sensor, a temperature/humidity sensor, an illumination sensor, and an ultraviolet (UV) sensor. Additionally or alternatively, the sensor module 440 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 440 may further include a control circuit to control at least one or more sensors belonging thereto. In one embodiment, the electronic device 101 may further include a processor configured, as a part of the processors 410 or separately from the processors 410, to control the sensor module 440, thereby controlling the sensor module 440 while the processors 410 are in a sleep state.

The input/output interface 450 may deliver a command or data, which is input from, for example, a user or a different external device, to a different component(s) of the electronic device 101, or may output a command or data, which is received from a different component(s) of the electronic device 101, to the user or to the different external device. The input/output interface 450 may include, for example, at least one of a speaker, a receiver, earphones, and a microphone.

The display 160 may include, for example, at least one of a Liquid Crystal Display (LCD), a Light-Emitting Diode (LED) display, an Organic Light-Emitting Diode (OLED) display, a Micro-Electro-Mechanical Systems (MEMS) display, an electronic paper display, and a projector. The display 160 may display, for example, various types of content (e.g., text, an image, a video, an icon, and/or a symbol) for the user.

The frame buffer 463 may store pixel values or pixel color values to be output to the display 160, and may be configured as memory, memory in the GPU 464, the display 160, or a display controller, or a virtual device, such as a Linux frame buffer device.

The GPU 464 may generate a screen including various objects, such as an item, an image, and text. The GPU 464 may calculate at least one attribute value, such as the coordinate value, shape, size, or color, of each object to be displayed according to the layout of a screen, and may generate a screen with various layouts including an object based on the calculated attribute value. Hereinafter, a screen or application screen may refer to the entirety or a portion of an image displayed on the surface (or display area) of the display 160. For example, an application screen may also be referred to as a graphic interface, a Graphical User Interface (GUI), an application window, an application area, or the like.

The display 160 may include a TSP (not shown) that is capable of receiving touch, gesture, proximity, or hovering input using an electronic pen or a body part of a user. The TSP may sense a touch/hovering using, for example, at least one of an electrostatic method, a pressure-sensitive method, an infrared method, and an ultrasonic method. Further, the TSP may additionally include a control circuit. The TSP may further include a tactile layer to provide a user with a tactile response.

The communication interface 470 may establish communication, for example, between the electronic device 101 and an external device (e.g., an external electronic device 404 or a server 406). For example, the communication interface 470 may be connected to a network 402 via wireless communication or wired communication to communicate with the external device (e.g., the external electronic device 404 or the server 406).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi (Wireless Fidelity), Bluetooth, Bluetooth low energy (BLE), ZigBee, near field communication (NFC), magnetic secure transmission, Radio Frequency (RF), and body area network (BAN). According to an embodiment, the wireless communication may include a GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 402 may include a telecommunications network, for example, at least one of a computer network (for example, a LAN or a WAN), the Internet, and a telephone network.

The external electronic device (404) may be the same type of device as or different type of device from the electronic device 101. According to various embodiments, all or some of the operations executed in the electronic device 101 may be executed in another electronic device or a plurality of electronic devices (for example, the electronic devices 102 and 104 or the server 406). According to an embodiment, when the electronic device 101 has to perform some functions or services automatically or in response to a request, the electronic device 101 may make a request for performing at least some functions relating thereto to another device (for example, the electronic device 404 or 104 or the server 406) instead of performing the functions or services by itself or in addition. Another electronic apparatus may execute the requested functions or the additional functions, and may deliver a result of the execution to the electronic apparatus 101. The electronic device 101 may provide the received result as it is, or may additionally process the received result to provide the requested functions or services. To this end, for example, cloud computing, distributed computing, or client-server computing technology may be used.

Figure 5:
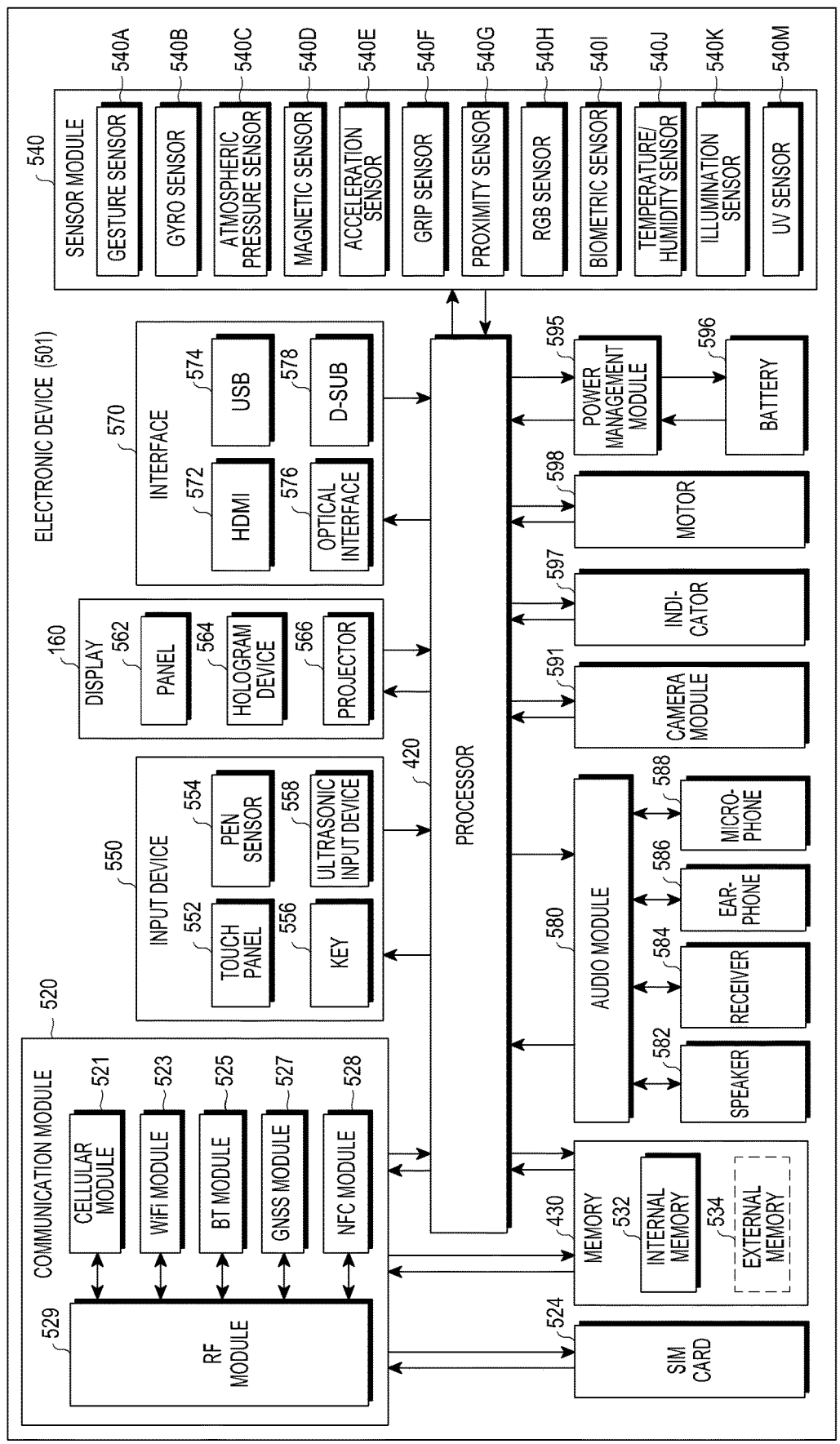
FIG. 5 is a block diagram illustrating an electronic device 101 according to various embodiments.

FIG. 5 is a block diagram of an electronic device 101 according to various embodiments.

Referring to FIG. 5, an electronic device 101 may include the entirety or a part of the electronic device 101 illustrated in FIG. 4. The electronic device 101 may include at least one processor 420 (for example, an AP), a communication module 520, a subscriber identification module 524, a memory 430, a sensor module 540, an input device 550, a display 160, an interface 570, an audio module 580, a camera module 591, a power management module 595, a battery 596, an indicator 597, and a motor 598. The processor 420 may control a plurality of hardware or software elements connected thereto and may perform various data processing and operations by driving an operating system or an application program. The processor 420 may be implemented by, for example, a System on Chip (SoC). According to an embodiment, the processor 420 may further include a graphic processing unit (GPU) and/or an image signal processor. The processor 420 may also include at least some of the elements illustrated in FIG. 5 (for example, a cellular module 521). The processor 420 may load, in volatile memory, instructions or data received from at least one of the other elements (for example, non-volatile memory), process the loaded instructions or data, and store the resultant data in the non-volatile memory.

The communication module 520 (for example, the communication interface 470) may include, for example, a cellular module 521, a Wi-Fi module 523, a Bluetooth module 525, a GNSS module 527, an NFC module 528, and an RF module 529. The cellular module 521 may provide, for example, a voice call, a video call, a text message service, an Internet service, or the like through a communication network. According to an embodiment, the cellular module 521 may identify and authenticate the electronic device 101 within a communication network using the subscriber identification module 524 (for example, a SIM card). According to an embodiment, the cellular module 521 may perform at least some of the functions that the processor 420 may provide. According to an embodiment, the cellular module 521 may include a communication processor (CP). According to some embodiments, at least some (for example, two or more) of the cellular module 521, the Wi-Fi module 523, the BT module 525, the GNSS module 527, and the NFC module 528 may be included in one Integrated Chip (IC) or IC package. The RF module 529 may transmit/receive, for example, a communication signal (for example, an RF signal). The RF module 529 may include, for example, a transceiver, a power amp module (PAM), a frequency filter, a low noise amplifier (LNA), an antenna, or the like. According to another embodiment, at least one of the cellular module 521, the Wi-Fi module 523, the BT module 525, the GPS module 527, and the NFC module 528 may transmit/receive an RF signal through a separate RF module. The subscriber identification module 524 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 430 may include, for example, an internal memory 532 or an external memory 534. The internal memory 532 may include, for example, at least one of a volatile memory (for example, a DRAM, an SRAM, an SDRAM, or the like) and a non-volatile memory (for example, one time programmable ROM (OTPROM), a PROM, an EPROM, an EEPROM, a mask ROM, a flash ROM, a flash memory, a hard disc drive, or a solid state drive (SSD)). The external memory 534 may include a flash drive, for example, a compact flash (CF), a secure digital (SD), a Micro-SD, a Mini-SD, an eXtreme digital (xD), a multi-media card (MMC), a memory stick, and the like. The external memory 534 may be functionally and/or physically connected to the electronic device 101 through various interfaces.

The sensor module 540 may, for example, measure a physical quantity or detect the operating state of the electronic device 101 and may convert the measured or detected information into an electrical signal. The sensor module 540 may include, for example, at least one of a gesture sensor 540A, a gyro sensor 540B, an atmospheric pressure sensor 1240C, a magnetic sensor 1240D, an acceleration sensor 1240E, a grip sensor 1240F, a proximity sensor 1240G, a color sensor 1240H (for example, a Red, Green, and Blue (RGB) sensor), a biometric sensor 1240I, a temperature/humidity sensor 540J, an illumination sensor 540K, and a ultraviolet (UV) sensor 1240M. Additionally or alternatively, the sensor module 540 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling one or more sensors included therein. In some embodiments, the electronic device 101 may further include a processor configured to control the sensor module 540 as a part of or separately from the AP 420, and may control the sensor module 240 while the AP 420 is in a sleep state.

The input device 550 may include, for example, a touch panel 552, a (digital) pen sensor 554, a key 556, or an ultrasonic input device 558. The touch panel 552 may use, for example, at least one of a capacitive type, a resistive type, an infrared type, and an ultrasonic type. Furthermore, the touch panel 552 may further include a control circuit. The touch panel 552 may further include a tactile layer to provide a tactile reaction to a user. The (digital) pen sensor 554 may include, for example, a recognition sheet that is a part of, or separate from, the touch panel. The key 556 may include, for example, a physical button, an optical key, or a keypad. The ultrasonic input device 558 may detect ultrasonic waves, which are generated by an input tool, through a microphone (for example, a microphone 588) to identify data corresponding to the detected ultrasonic waves.

The display 160 may include a panel 562, a hologram device 564, a projector 566, and/or a control circuit for controlling them. The panel 562 may be implemented to be, for example, flexible, transparent, or wearable. The panel 562, together with the touch panel 552, may be configured as one or more modules. According to an embodiment, the panel 562 may include a pressure sensor (or a POS sensor) which may measure a strength of pressure of a user's touch. The pressure sensor may be implemented so as to be integrated with the touch panel 552 or may be implemented as one or more sensors separate from the touch panel 552. The hologram device 564 may show a three dimensional image in the air by using an interference of light. The projector 566 may display an image by projecting light onto a screen. The screen may be located, for example, in the interior of, or on the exterior of, the electronic device 101. The interface 570 may include, for example, an HDMI 572, a USB 574, an optical interface 576, or a D-subminiature (D-sub) 578. The interface 570 may be included in, for example, the communication circuit 470 illustrated in FIG. 4. Additionally or alternatively, the interface 570 may, for example, include a mobile high-definition link (MHL) interface, a secure digital (SD) card/multi-media card (MMC) interface, or an infrared data association (IrDA) standard interface.

The audio module 580 may convert, for example, sound into an electrical signal, and vice versa. At least some elements of the audio module 580 may be included, for example, in the input/output interface 450 illustrated in FIG. 4. The audio module 580 may process sound information that is input or output through, for example, a speaker 582, a receiver 584, earphones 586, the microphone 588, and the like. The camera module 591 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 595 may manage, for example, the power of the electronic device 101. According to an embodiment, the power management module 595 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 596 and a voltage, current, or temperature while charging. The battery 596 may include, for example, a rechargeable battery and/or a solar battery.

The indicator 597 may display a particular state, for example, a booting state, a message state, a charging state, or the like of the electronic device 101 or a part (for example, the processor 420) of the electronic device 201. The motor 598 may convert an electrical signal into a mechanical vibration and may generate a vibration, a haptic effect, or the like. The electronic device 101 may include a mobile TV support device that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. In various embodiments, an electronic device (for example, the electronic device 101) may omit some elements or may further include additional elements, or some of the elements of the electronic device may be combined with each other to configure one entity, in which case the electronic device may identically perform the functions of the corresponding elements prior to the combination.

Figure 6:
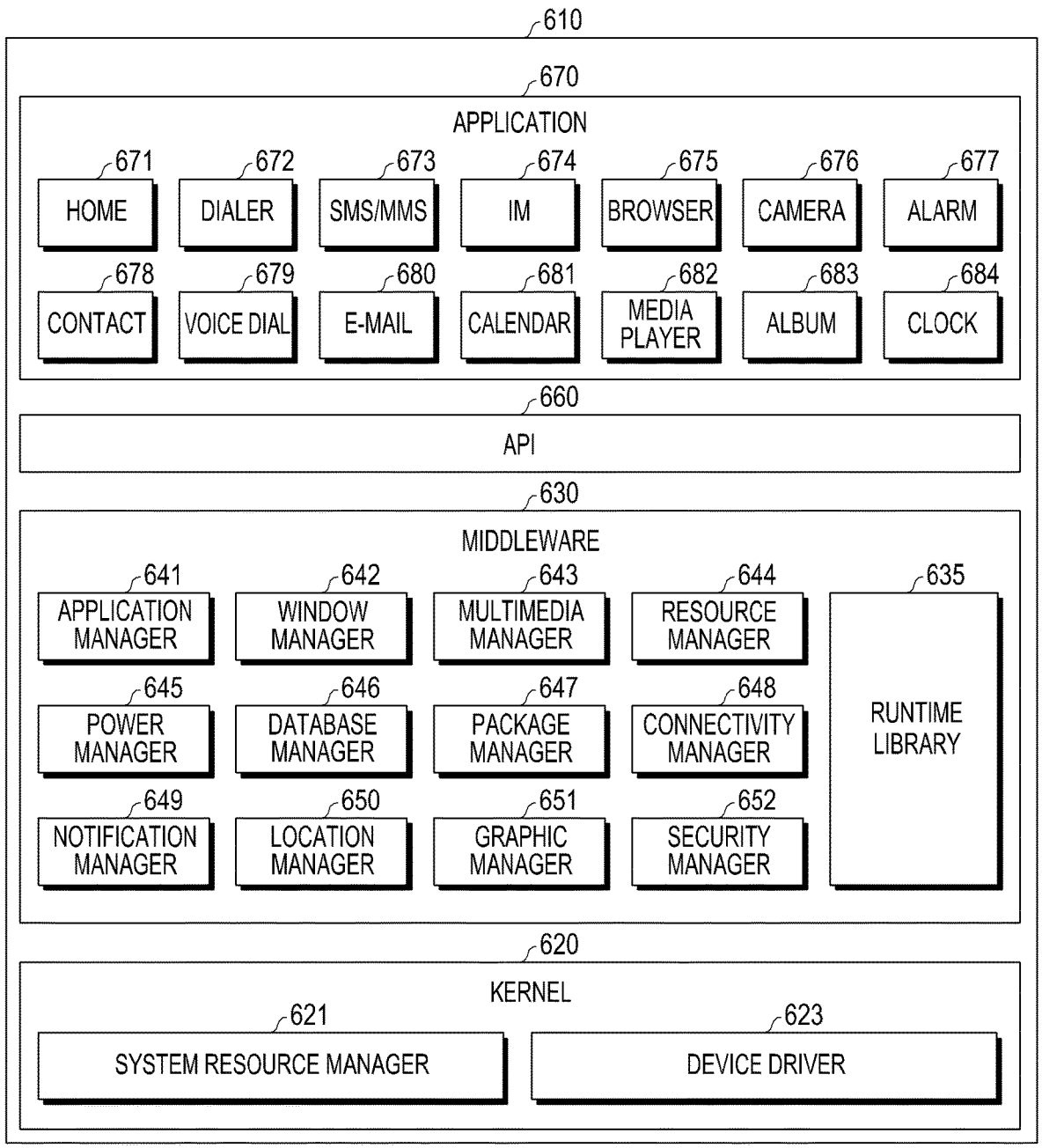
FIG. 6 is a block diagram illustrating a program module according to various embodiments of the present disclosure.

FIG. 6 is a block diagram illustrating a program module according to various embodiments of the present disclosure.

Referring to FIG. 6, the program module 610 may include an Operating System (OS) that controls resources related to an electronic device (e.g., the electronic device 101) and/or various applications (e.g., the application) that run on the OS. The OS may be, for example, Android™, iOS™, Windows™, Symbian™, Tizen™, or Samsung Bada™.

The program module 610 may include a kernel 620, middleware 630, an API 660, and/or an application 670. At least part of the program module 610 may be preloaded onto the electronic device, or may be downloaded from the external electronic device 404 or the server 406.

The kernel 620 may include, for example, a system resource manager 621 and/or a device driver 623. The system resource manager 621 may perform control, allocation, or recovery of system resources. According to one embodiment, the system resource manager 621 may include a process management unit, a memory management unit, or a file system management unit. The device driver 623 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 630 may provide, for example, functions commonly needed for applications 670, or may provide the applications 670 with various functions through the API 660 so that the applications 670 may efficiently use the limited systems resources in the electronic device. According to one embodiment, the middleware 630 may include at least one of a runtime library 635, an application manager 641, a window manager 642, a multimedia manager 643, a resource manager 644, a power manager 645, a database manager 646, a package manager 647, a connectivity manager 648, a notification manager 649, a location manager 650, a graphic manager 651, and a security manager 652.

The runtime library 635 may include, for example, a library module used by a complier to add a new function through a programming language while the application 670 is running. The runtime library 635 may perform input/output management, memory management, or a function for an arithmetic operation.

The application manager 641 may manage, for example, the life cycle of at least one of the applications 670. The window manager 642 may manage GUI resources used for a screen. The multimedia manager 643 may identify formats that are necessary to play various media files, and may encode or decode a media file using a codec suitable for the corresponding format. The resource manager 644 may manage resources, such as source code, memory, or storage space, for at least one of the applications 670.

The power manager 645 may manage a battery or a power supply, for example, by interworking with a Basic Input/Output System (BIOS), and may provide information on power necessary for operation of the electronic device. The database manager 646 may generate, retrieve, or change a database to be used for at least one of the applications 670. The package manager 647 may manage the installation or update of an application distributed in the form of a package file.

The connectivity manager 648 may manage wireless connectivity, for example, Wi-Fi or Bluetooth. The notification manager 649 may display or report an event, for example, an incoming message, an appointment, and a proximity notification, to a user in an unobtrusive manner. The location manager 650 may manage information about the location of the electronic device. The graphic manager 651 may manage a graphic effect to be provided for the user or a user interface related to the graphic effect. The security manager 652 may provide a general security function necessary for system security or user authentication. According to one embodiment, when an electronic device (e.g., the electronic device 101) includes a phone function, the middleware 630 may further include a telephony manager to manage a voice or video call function of the electronic device.

The middleware 630 may include a middleware module to form various combinations of functions of the foregoing elements. The middleware 630 may provide a specialized module for each OS in order to provide a differentiated function. Further, the middleware 630 may dynamically delete some of the existing elements or add new elements.

The API 660 (e.g., the API 145) is, for example, a set of API programming functions, and may be provided with a different configuration depending on the operating system. For example, one API set for each platform may be provided in the case of Android or iOS, while two or more API sets for each platform may be provided in the case of Tizen.

The application 670 may include, for example, a home screen 671, a dialer 672, an SMS/MMS 673, Instant Messaging (IM) 674, a browser 675, a camera 676, an alarm 677, an address book 678, a voice dialer 679, email 680, a calendar 681, a media player 682, an album 683, a clock 684, a healthcare application (e.g., for measuring exercise or blood sugar), or at least one application capable of performing a function of providing environmental data (e.g., for providing atmospheric pressure, humidity, or temperature data).

According to one embodiment, the application 670 may include an application that supports information exchange between an electronic device (e.g., the electronic device 101) and the external electronic device 404 or the server 406 (for convenience, "information exchange application"). The information exchange application may include, for example, a notification relay application for relaying specific information to the external electronic device or a device management application for managing the external electronic device.

For example, the notification relay application may function to relay notification information, which is generated in another application (e.g., an SMS/MMS application, email application, healthcare application, or environmental data application) of the electronic device, to the external electronic device 404 or the server 406. Further, for example, the notification relay application may receive notification information from the external electronic device and may provide the notification information to the user.

The device management application may manage (e.g., install, delete, or update), for example, at least one function (e.g., a function of turning on/turning off the external electronic device itself (or some components thereof) or adjusting the brightness (or resolution) of a display) of the external electronic device 404 or the server 406 communicating with the electronic device, an application operating in the external electronic device, or a service (e.g., a call service or a message service) provided by the external electronic device.

According to one embodiment, the application 670 may include an application (e.g., a healthcare application of a mobile medical device) assigned according to the attributes of the external electronic device 404 or the server 406.

According to one embodiment, the application 670 may include an application received from the external electronic device 404 or the server 406. According to one embodiment, the application 670 may include a preloaded application or a third-party application that can be downloaded from the server. The components of the program module 610 according to the illustrated embodiment may be referred to using different terms depending on the type of an OS.

According to various embodiments, at least part of the program module 610 may be implemented by software, firmware, hardware, or combinations of at least two or more thereof. At least part of the program module 610 may be implemented (e.g., run), for example, by the processor 420. At least part of the program module 610 may include, for example, a module, a program, a routine, sets of instructions, or a process to perform one or more functions.

FIGS. 7 to 11B illustrate a program module according to various embodiments of the present disclosure.

Figure 7:
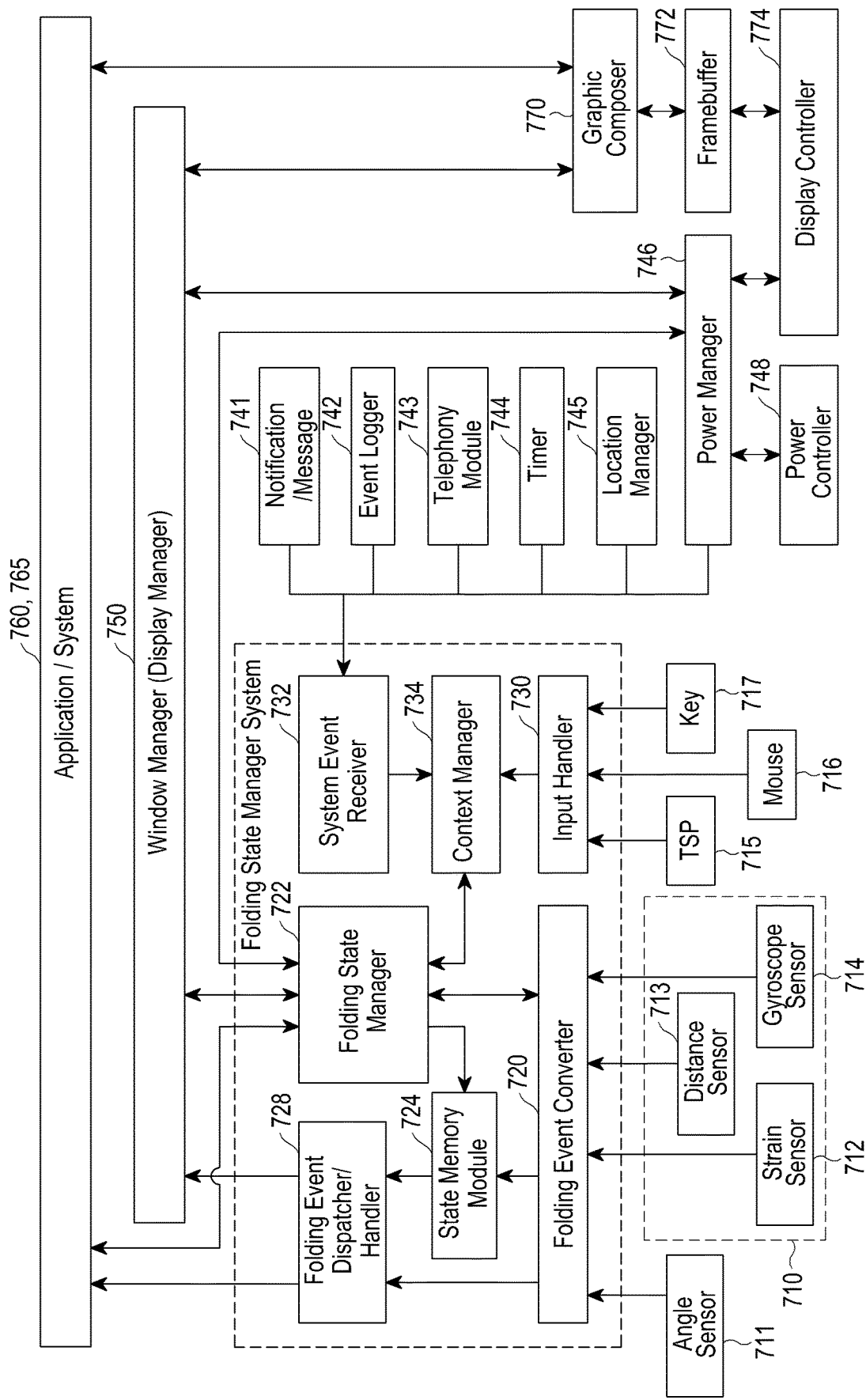
FIGS. 7 to 11B illustrate a program module according to various embodiments of the present disclosure.

Referring to FIG. 7, the program module according to various embodiments of the present disclosure may include an OS that controls resources related to the electronic device 101 and/or various applications (e.g., the application) that run on the OS. The OS may be, for example, Android™, iOS™, Windows™, Symbian™, Tizen™, or Bada™. At least part of the program module may be preloaded onto the electronic device, or may be downloaded from the external electronic device 404 or the server 406.

A folding event converter 720 (also referred to as an event converters may analyze raw data received from a sensor 710 (e.g., a strain sensor 712, a distance sensor 713, or a gyroscope sensor 714) and may calculate a folding state. Hereinafter, folding may be referred to as bending, and a folding event may be referred to as a folding gesture.

A folding event dispatcher/handler 728 (also referred to as an event handler) may forward a folding state/event to a system 765 or an application 760. A folding state manager 722 may forward the folding state to a corresponding module. A state memory module 724 may store the folding state. A notification/message manager 741 may provide a user with information about an event, for example, an incoming message, an appointment, and a proximity notification. An event logger 742 may record events and may display the events in chronological order. A telephony module 743 may manage a voice/video call function of the electronic device.

A timer 744 may provide a timer function. A location manager 745 may manage, for example, location information of the electronic device. A power manager 746 may manage the capacity of a battery or a power supply, for example, in conjunction with a power controller 748, and may provide information on the power necessary for the operation of the electronic device. A system event receiver 732 may receive an event from the notification/message manager 741, the event logger 742, the telephony module 743, the timer 744, or the power manager 746, and may forward the event to a context manager 734.

An input handler 730 may receive an input from a TSP 715, a mouse 716, or a key 717, and may forward the input to the context manager 734. The context manager 734 may manage a system service based on the input, the system event, the folding state, or the like. A display controller 774 may perform screen on/off control. A frame buffer 772 may store pixel values or pixel color values to be output to a display. A graphic composer 770 may generate a screen including various objects, such as an item, an image, and text. A window manager 750 may manage GUI resources used for a screen.

An application 760 may include, for example, a home screen, a dialer, an SMS/MMS, Instant Messaging (IM), a browser, a camera, an alarm, an address book, a voice dialer, email, a calendar, a media player, an album, a watch, a healthcare application (e.g., for measuring exercise or blood sugar), or an application for providing environmental data (e.g., atmospheric pressure, humidity, or temperature data).

At least part of the program module may be implemented (e.g., run) by software, firmware, hardware (e.g., a processor), or combinations of at least two or more thereof, and may include a module, a program, a routine, sets of instructions, or a process to perform one or more functions.

Figure 8:
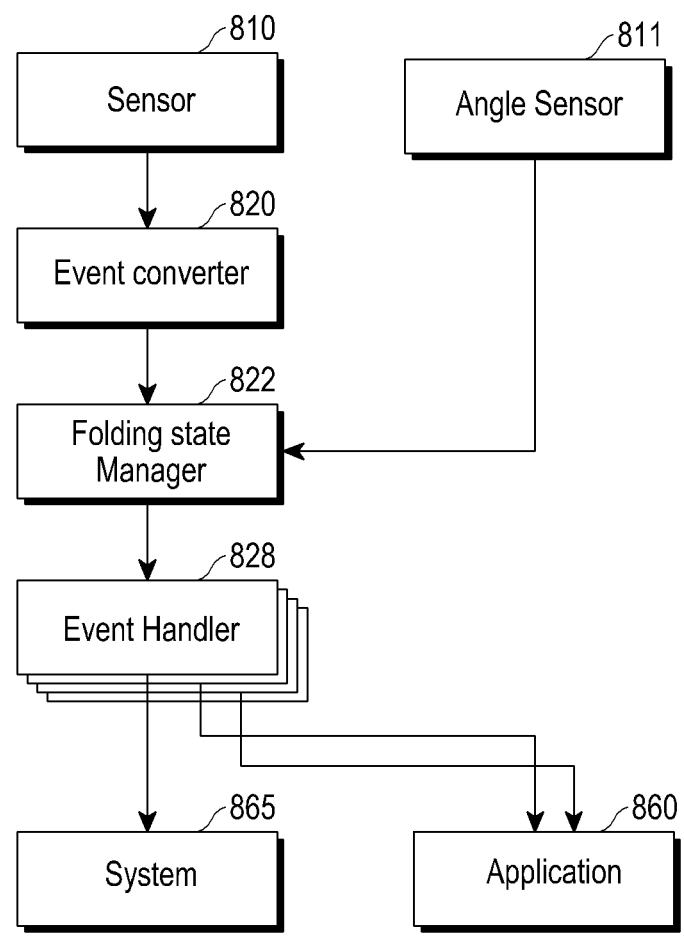

Referring to FIG. 8, an event converter 820 may analyze raw data from a sensor 810 and may calculate a folding state. For example, when the first sensor 230 and the second sensor 240 each include a gyroscope sensor, the event converter 820 may compare the angle between the axis of the first sensor 230, measured by the first sensor 230, and the ground with the angle between the axis of the second sensor 240, measured by the second sensor 240, and the ground, thereby calculating the folding angle of the electronic device 101.

Alternatively, when the first sensor 230 includes a magnetic-force-sensing sensor and the second sensor 240 includes a magnetic-force-applying part, the event converter 820 may detect the strength of the magnetic force applied by the magnetic-force-applying part attributable to bending of the electronic device 101.

In this case, since the detected strength of the magnetic force is proportional to the folding angle, that is, the strength of the magnetic force increases as the electronic device 101 is folded more, the event converter 820 may calculate the folding angle of the electronic device 101 based on the strength of the magnetic force.

The folding state may be measured directly by an angle sensor 811, or may be determined through calculations made by the event converter 820. The folding state may be represented by an angle, by one state corresponding to a certain angular range, or by a trend of an increasing/decreasing angle.

A folding state manager 822 may forward the folding state/event to an event handler 828, and the registered event handler 828 may process the folding event. The event handler 828 may be registered by various modules, such as a system 865, an application 860, or a background service, and the registered event handler 828 may process a folding event according to priority. For example, priorities may be determined in the following order: the system 865, a visible (or activated) application, an application that is running but is not directly visible to the user, and a background service that does not have a visible UI. For example, when the event handler with the highest priority does not process a folding event, the event handler with the next highest priority may process the folding event.

Sequential processing of a folding event may have the following effect.

When the electronic device is folded within a preset angle, the system 865 may display an alpha screen or a gadget. For example, the alpha screen may be configured as a window that can be freely moved and displays at least one of multimedia, content, user-customized information, and real-time information. When a particular situation, such as a landscape mode, is given, the system 865 may not process the folding event. When an event handler 828 with the next highest priority is registered in a video application, the video application may stop or start playing a video in response to the folding/unfolding event.

Figure 9:
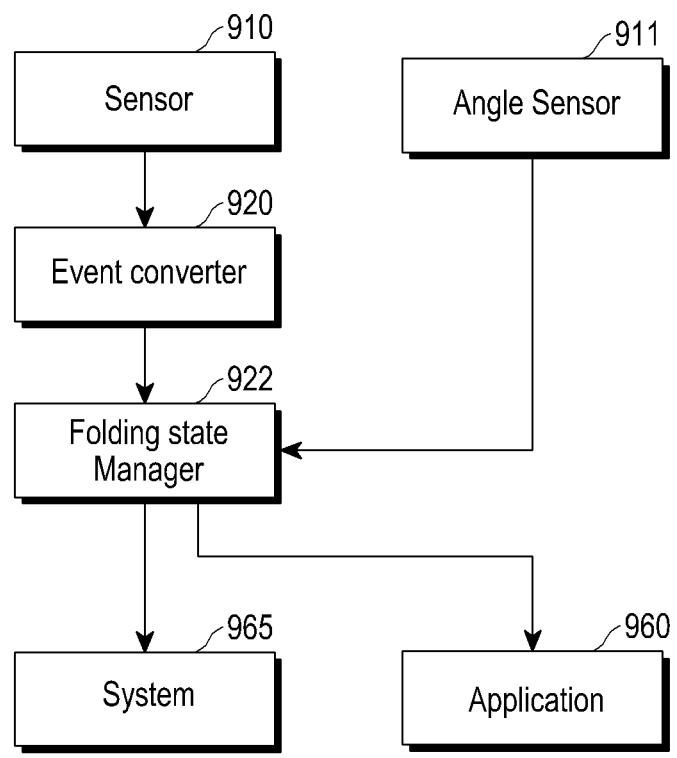

Referring to FIG. 9, a folding state manager 922 may forward a folding state/event directly to a system 965 or an application 960, rather than via an event handler. For example, the folding state manager 922 may determine whether to forward the folding event/a target to which the folding event is forwarded based on context information on the electronic device obtained from a context manager 934.

Figure 10A:
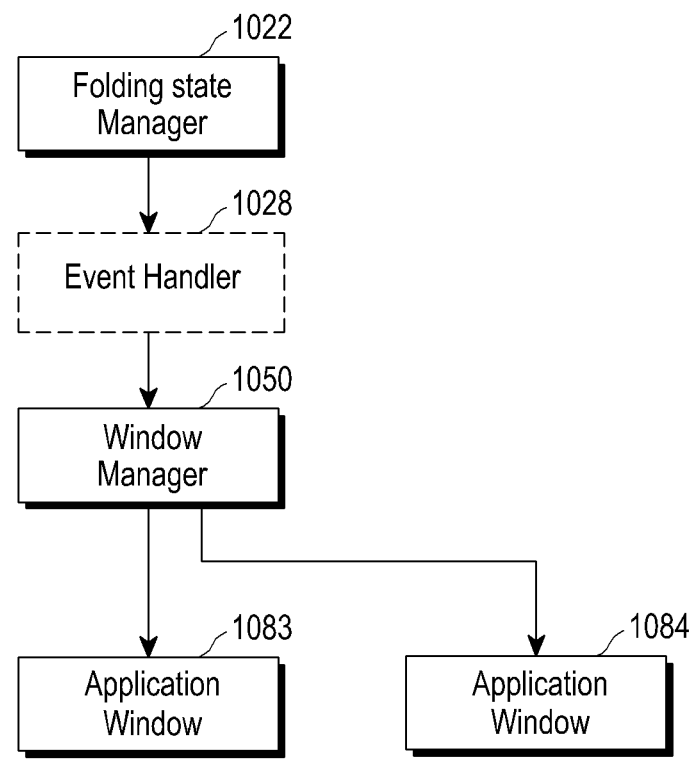
Figure 10B:
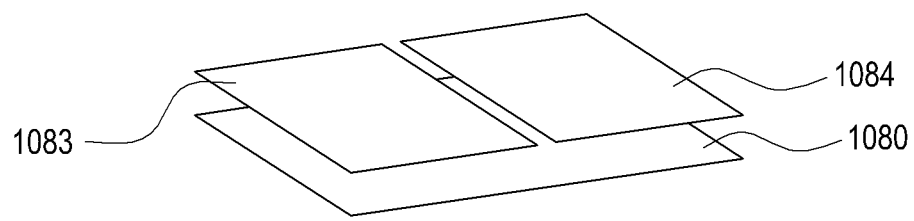

Referring to FIGS. 10A and 10B, among screen-splitting methods, when only the screen on a display 1080 is split into a plurality of areas without virtually splitting the display 1080, corresponding points on application windows 1083 and 1084 have different coordinates on the display 1080 depending on the positions of the application windows, and thus a window manager 1050 may adjust the application windows 1083 and 1084 to correspond to the split areas.

Figure 11A:
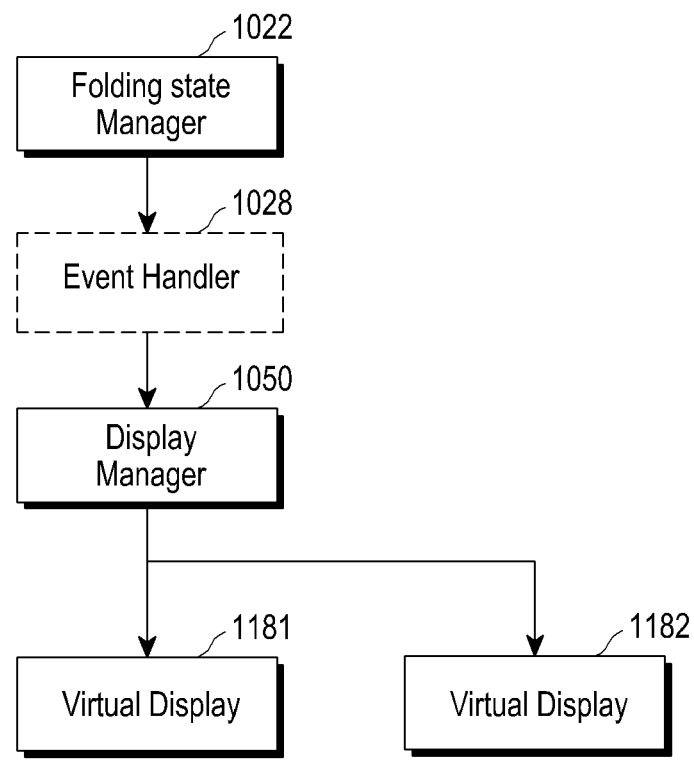
Figure 11B:
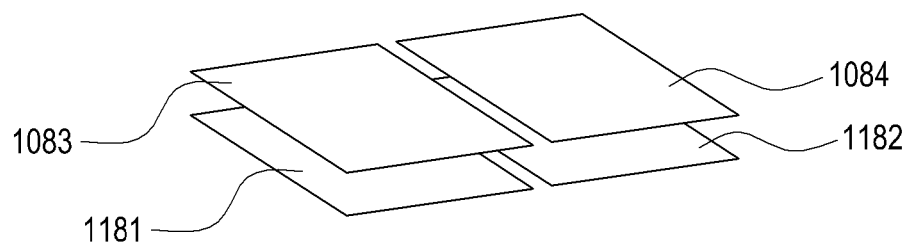

Referring to FIGS. 11A and 11B, among screen-splitting methods, when a display is split into virtual displays 1181 and 1182, the plurality of virtual displays 1181 and 1182 may correspond one to one to a plurality of application windows 1083 and 1084, and corresponding points on the application windows have the same coordinates on the corresponding displays despite the different positions of the application windows 1083 and 1084, and thus a display manager 1050 may adjust the virtual displays 1181 and 1182 to correspond to split areas.

According to various embodiments of the present disclosure, an electronic device for controlling a display may include: a display configured to display a first application in a first area; and a processor configured to detect a shape change of the display and to display a second application, paired with the first application displayed in the first area, in a second area on the display in response to the detection.

According to an embodiment, the electronic device may further include a sensor unit configured to detect that the electronic device has been outspread or folded.

According to an embodiment, the processor may be configured to determine whether the second application, linked with a function of the first application, is set in response to the detected shape change.

According to an embodiment, when the second application is set, the processor may be configured to display the second application in the second area and to display a secondary screen in a third area on the display.

According to an embodiment, the processor may be configured to display the secondary screen on one side of the display.

According to an embodiment, the processor may be configured to split the first area into a first sub-area and a second sub-area upon detecting an input on the secondary screen, to display the first application in the first sub-area, to display the second application in the second sub-area, and to display the secondary screen in the second area, wherein the secondary screen displayed in the second area may include an object of at least one application linked with the function of the first application.

According to an embodiment, when the second application is not set, the processor may be configured to determine whether the first application supports an expansion mode.

According to an embodiment, the processor may be configured to display a secondary screen in the second area when the first application does not support the expansion mode, wherein the secondary screen may include an object of at least one application linked with the function of the first application.

According to an embodiment, when the first application supports an expansion mode, the processor may be configured to determine whether the supported expansion mode is an area expansion mode.

According to an embodiment, when the expansion mode is an area expansion mode, the processor may be configured to enlarge the first application to be displayed in the first area and the second area and to display a secondary screen in the third area on the display.

According to an embodiment, when the expansion mode is not an area expansion mode, the processor may be configured to display an additional function or additional information associated with the first application in the second area and to display a secondary screen in the third area on the display.

According to an embodiment, when it is detected that the shape-changed display is folded after the display is outspread by the shape change, the processor may be configured to deactivate the second area.

According to an embodiment, the processor may be configured to display a secondary screen in a third area on the display in response to the detected shape change, wherein the secondary screen may include at least one object corresponding to recommended items customized for the first application.

Figure 12:
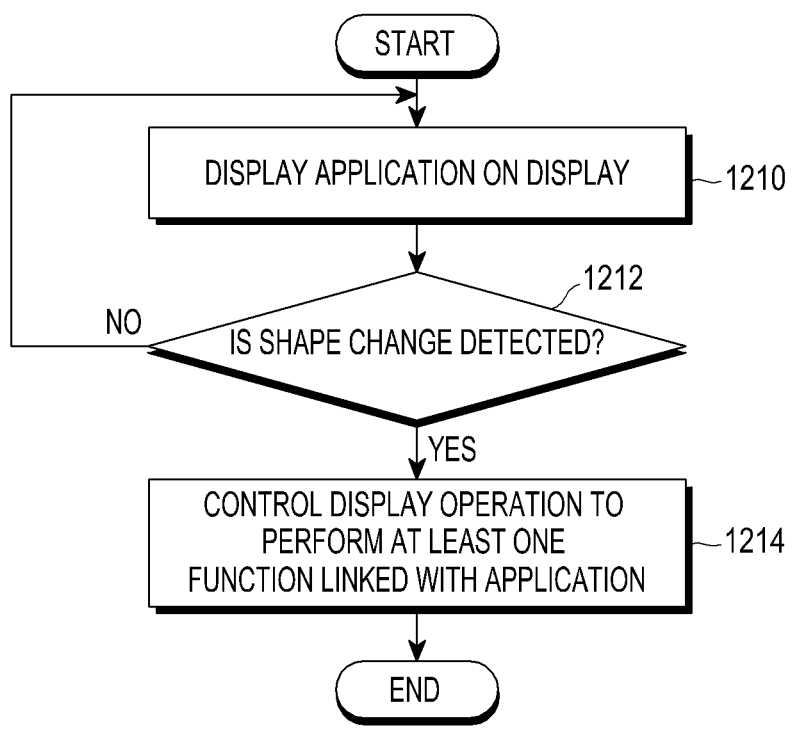
FIG. 12 is a flowchart illustrating a process for controlling a display of an electronic device according to various embodiments of the present disclosure.

FIG. 12 is a flowchart illustrating a process for controlling a display of an electronic device according to various embodiments of the present disclosure.

Hereinafter, the process for controlling the display of the electronic device, according to various embodiments of the present disclosure, will be described in detail with reference to FIG. 12.

In operation 1210, the electronic device 101 may display an application on the display. The electronic device 101 may display a first application in a first area on the display. The electronic device 101 may control the display operation of the display in response to a change in the shape of the display 160 (e.g., outspreading or folding). The display 160 of the electronic device 101 may split a screen into a plurality of areas corresponding to the change in the shape of the display 160 (e.g., outspreading or folding). The electronic device 101 may display at least one application on the display. The electronic device 101 may display a plurality of applications on the display 160, in which each of the applications may be displayed in each of the plurality of split areas. The split areas of the display 160 may be divided into a main area and at least one sub-area. The area that is shown the most to a user due to the user's grip may be designated as the main area, and an area not shown to the user due to the user's grip may be designated as a sub-area. When the display 160 is folded, the electronic device 101 may display the first application in the main area. Further, when the display 160 is folded, the electronic device 101 may switch the sub-area to an inactive state.

In operation 1212, the electronic device 101 may detect whether a change in the shape of the display 160 (e.g., outspreading) occurs. The electronic device 101 may include a sensor unit capable of sensing outspreading or folding. The electronic device 101 may sense outspreading or folding of the display 160 through the sensor unit. The electronic device 101 may determine whether the display 160 is currently outspread or folded based on the angle at which the display 160 is outspread (or folded). When the angle exceeds a predetermined range, the electronic device 101 may determine whether the display 160 is currently outspread or folded. For example, when the display 160 is outspread from the folded state and the angle of the display

160 that is outspread from the folded state exceeds the predetermined range, the electronic device 101 may determine that the display 160 is currently outspread. For example, when the display 160 is folded from an outspread state and the angle of the display 160 that is folded from the outspread state exceeds the predetermined range, the electronic device 101 may determine that the display 160 is currently folded. The predetermined range may be variably adjusted.

In operation 1214, the electronic device 101 may control the operation of the display in order to perform at least one function linked with the application. When it is determined that the display 160 changes shape (e.g., is outspread), the electronic device 101 may determine whether at least one application paired with the first application displayed in the first area of the display 160 is set. When the electronic device 101 determines that at least one application paired with the first application displayed in the first area is set, the electronic device 101 may display the second application paired with the first application in a second area of the display 160. When the application paired with the first application is not set, the electronic device 101 may determine whether the first application supports an expansion mode. When the first application does not support the expansion mode, the electronic device 101 may display a secondary screen in the second area. The secondary screen may include an object of at least one application linked with a function of the first application. The objects of the at least one application displayed on the secondary screen may be displayed according to priorities. The priorities may include the frequency of use, recent usage order, and user settings. The objects of the at least one application displayed on the secondary screen may be displayed on the secondary screen based on at least one priority from among the frequency of use, recent usage order, and user settings.

The electronic device 101 may determine whether the expansion mode supported by the first application is an area expansion mode. When it is determined that the expansion mode supported by the first application is an area expansion mode, the electronic device 101 may enlarge and display the first application in the first area and the second area. The electronic device 101 may enlarge and display the first application on the entire screen of the display 160 including the first area and the second area. In addition, when the expansion mode supported by the first application is an area expansion mode, the electronic device 101 may display the secondary screen in a third area of the display 160. The electronic device 101 may display an additional function or additional information linked with the first application in the second area. When the expansion mode supported by the first application is not an area expansion mode, the electronic device 101 may display the additional function or the additional information linked with the first application in the second area of the display.

According to various embodiments of the present disclosure, a method for controlling a display by an electronic device may include: displaying a first application in a first area on a display; detecting a shape change of the display; determining a second application, paired with the first application displayed in the first area, in response to the detection; and displaying the determined second application in a second area on the display.

According to an embodiment, the method may further include: determining whether the second application, which is linked with a function of the first application, is set in response to the detected shape change; displaying the second application in the second area when the second application is set; and displaying a secondary screen in a third area of the display.

According to an embodiment, the method may further include: splitting the first area into a first sub-area and a second sub-area upon detecting an input on the secondary screen; displaying the first application in the first sub-area; displaying the second application in the second sub-area, and displaying the secondary screen in the second area, wherein the secondary screen displayed in the second area may include an object of at least one application linked with the function of the first application.

According to an embodiment, the method may further include: determining whether the first application supports an expansion mode when the second application is not set; and displaying a secondary screen in the second area when the first application does not support the expansion mode.

According to an embodiment, the method may further include: determining whether the supported expansion mode is an area expansion mode when the first application supports an expansion mode; and enlarging the first application to be displayed in the first area and the second area and displaying a secondary screen in the third area on the display when the expansion mode is an area expansion mode.

According to an embodiment, the method may further include: displaying an additional function or additional information associated with the first application in the second area and displaying a secondary screen in the third area on the display when the expansion mode is not an area expansion mode.

Figure 13:
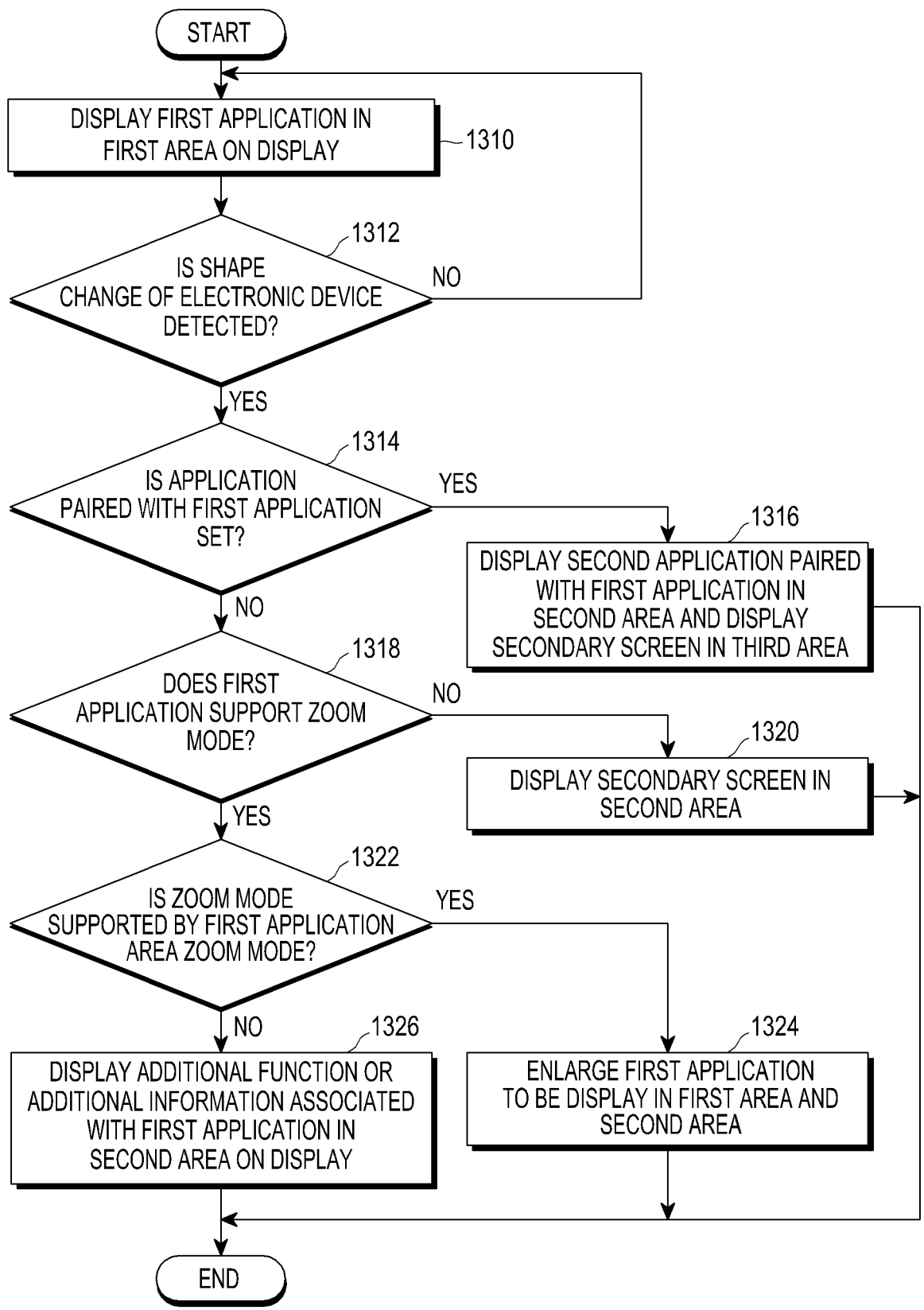
FIG. 13 is a flowchart illustrating a process for controlling a display of an electronic device according to an embodiment of the present disclosure.

FIG. 13 is a flowchart illustrating a process for controlling a display of an electronic device according to an embodiment of the present disclosure.

Hereinafter, the process for controlling the display of the electronic device, according to an embodiment of the present disclosure, will be described in detail with reference to FIG. 13.

In operation 1310, the electronic device 101 may display a first application in a first area on the display. The electronic device 101 may control the display operation of the display in response to a change in the shape of the display 160 (e.g., outspreading or folding). The display 160 of the electronic device 101 may split a screen into a plurality of areas corresponding to the change in shape (e.g., outspreading or folding). The electronic device 101 may display at least one application on the display. The electronic device 101 may display a plurality of applications on the display 160, in which each of the applications may be displayed in each of the plurality of split areas. The split areas of the display 160 may be divided into a main area and at least one sub-area. The area shown the most to a user due to the user's grip may be designated as the main area, and an area not shown to the user due to the user's grip may be designated as the sub-area. When the display 160 is in a folded state, the electronic device 101 may display the first application in the main area. Further, when the display 160 is in the folded state, the electronic device 101 may switch the sub-area to an inactive state.

In operation 1312, the electronic device 101 may detect whether a change in the shape of the display 160 (e.g., outspreading) occurs. The electronic device 101 may include a sensor unit capable of sensing outspreading or folding. The electronic device 101 may sense outspreading or folding of the display 160 through the sensor unit. The electronic device 101 may determine whether the display 160 is currently outspread or folded based on the angle at which the display 160 is outspread (or folded). When the angle exceeds a predetermined range, the electronic device 101 may determine whether the display 160 is currently outspread or folded. For example, when the display 160 is outspread from the folded state and the angle of the display 160 that is outspread from the folded state exceeds the predetermined range, the electronic device 101 may determine that the display 160 is currently outspread. For example, when the display 160 is folded from an outspread state and the angle of the display 160 that is folded from the outspread state exceeds the predetermined range, the electronic device 101 may determine that the display 160 is currently folded. The predetermined range may be variably adjusted.

In operation 1314, the electronic device 101 may determine whether an application paired with the first application is set. When it is determined that the display 160 changes shape (e.g., is outspread), the electronic device 101 may determine whether at least one application paired with the first application displayed in the first area is set. For example, when it is determined that the display 160 is outspread with an email application displayed in the first area, the electronic device 101 may determine whether a chat application (e.g., a texting application or a talk application) paired with the email application is set.

When the electronic device 101 determines that at least one application paired with the first application displayed in the first area is set, the electronic device 101 may display the second application paired with the first application in a second area of the display 160 in operation 1316. The electronic device 101 may display a secondary screen in a third area. The electronic device 101 may display the second application, paired with the first application, and the secondary screen together on the display 160. The secondary screen may be displayed on one side (e.g., boundary) of the display 160. The secondary screen may include an object of at least one application linked with a function of the first application. The secondary screen may include at least one object corresponding to recommended items customized for the first application. The secondary screen may be displayed in the second area by a drag gesture. For example, when it is determined that the display 160 is outspread with the email application displayed in the first area of the display 160, the electronic device 101 may display the chat application (e.g., a texting application or a chatting application) paired with the email application in the second area of the display 160.

In operation 1318, the electronic device 101 may determine whether the first application supports an expansion mode. When no application paired with the first application is set, the electronic device 101 may determine whether the first application supports an expansion mode. The expansion mode may include a mode for enlarging (e.g., zooming in) and displaying the displayed first application on the entire screen of the display 160.

In operation 1320, the electronic device 101 may display a secondary screen in the second area. When the first application does not support the expansion mode, the electronic device 101 may display the secondary screen in the second area. The secondary screen may include an object of at least one application linked with a function of the first application. The secondary screen may include at least one object corresponding to recommended items customized for the first application. For example, when the display 160 is outspread with the email application displayed in the first area of the display 160, it is determined that the pair application is not set, and the first application does not support the expansion mode, the electronic device 101 may display the secondary screen in the second area. The secondary screen may include an object for at least one application that is not paired with the email application. The objects of the at least one application displayed on the secondary screen may be displayed according to priorities. The priorities may include the frequency of use, recent usage order, and user settings. The objects of the at least one application displayed on the secondary screen may be displayed on the secondary screen based on at least one priority from among the frequency of use, recent usage order, and user settings.

In operation 1322, the electronic device 101 may determine whether the supported expansion mode is an area expansion mode. The electronic device 101 may determine whether the expansion mode supported by the first application is an area expansion mode. When an application is displayed on the display 160, a user may be inconvenienced due to the limited screen size of the display 160. To solve such a user inconvenience, the application may support a function of being displayed on the entire screen of the display 160. For example, in the case of a video or a picture, when the display 160 is placed horizontally, the video or picture may be displayed through the entire screen of the display 160.

In operation 1324, the electronic device 101 may enlarge and display the first application in the first area and the second area. When the expansion mode supported by the first application is an area expansion mode, the electronic device 101 may enlarge and display the first application in the first area and the second area on the display 160. The electronic device 101 may enlarge and display the first application on the entire screen of the display 160, including the first area and the second area. The electronic device 101 may display a menu button 1951 providing various functions of the enlarged application on the enlarged application. For example, when the expansion mode supported for a map displayed in the first area on the display 160 is an area expansion mode, the electronic device 101 may enlarge (magnify) and display the map displayed in the first area on the entire screen of the display 160. Further, when the expansion mode supported by the first application is an area expansion mode, the electronic device 101 may display a secondary screen in the third area of the display 160. The secondary screen may include an object of at least one application linked with a function of the first application. The secondary screen may include at least one object corresponding to recommended items customized for the first application.

In operation 1326, the electronic device 101 may display an additional function or additional information linked with the first application in the second area. When the expansion mode supported by the first application is not an area expansion mode, the electronic device 101 may display the additional function or the additional information linked with the first application in the second area of the display. For example, when it is sensed that the electronic device 101 is outspread with a contact information application displayed in the first area on the display 160 and the expansion mode supported for the contact information application displayed in the first area is not an area expansion mode, the electronic device 101 may display a recent call history and an incoming and outgoing texting record of a user in the second area. Alternatively, when it is sensed that the electronic device 101 is outspread with an email application displayed in the first area on the display 160 and the expansion mode supported for the email application displayed in the first area is not an area expansion mode, the electronic device 101 may display an important sender, important mail, and a record of a sent items folder in the second area. Further, when it is sensed that the electronic device 101 is outspread with a search result displayed by inputting a keyword that the user desires to retrieve through a web browser displayed in the first area on the display 160, the electronic device 101 may determine whether the expansion mode supported for the web browser is an area expansion mode. When the expansion mode supported for the web browser is not an area expansion mode, the electronic device 101 may display the result of an additional search other than the displayed result in the second area. Alternatively, when it is sensed that the electronic device 101 is outspread with a chat application displayed in the first area on the display 160, the electronic device 101 may determine whether the expansion mode supported for the chat application is an area expansion mode. When the expansion mode supported for the chat application is not an area expansion mode, the electronic device 101 may display various emoticons used for chatting with a counterpart, an object of another application linked with the chat application, and an object of a recently used application in the second area. In addition, when it is sensed that the electronic device 101 is outspread with a home screen displayed in the first area on the display 160, the electronic device 101 may determine whether the expansion mode supported for the home screen is an area expansion mode. When the expansion mode supported for the home screen is not an area expansion mode, the electronic device 101 may display an object of at least one application linked with the home screen in the second area.

Figure 14:
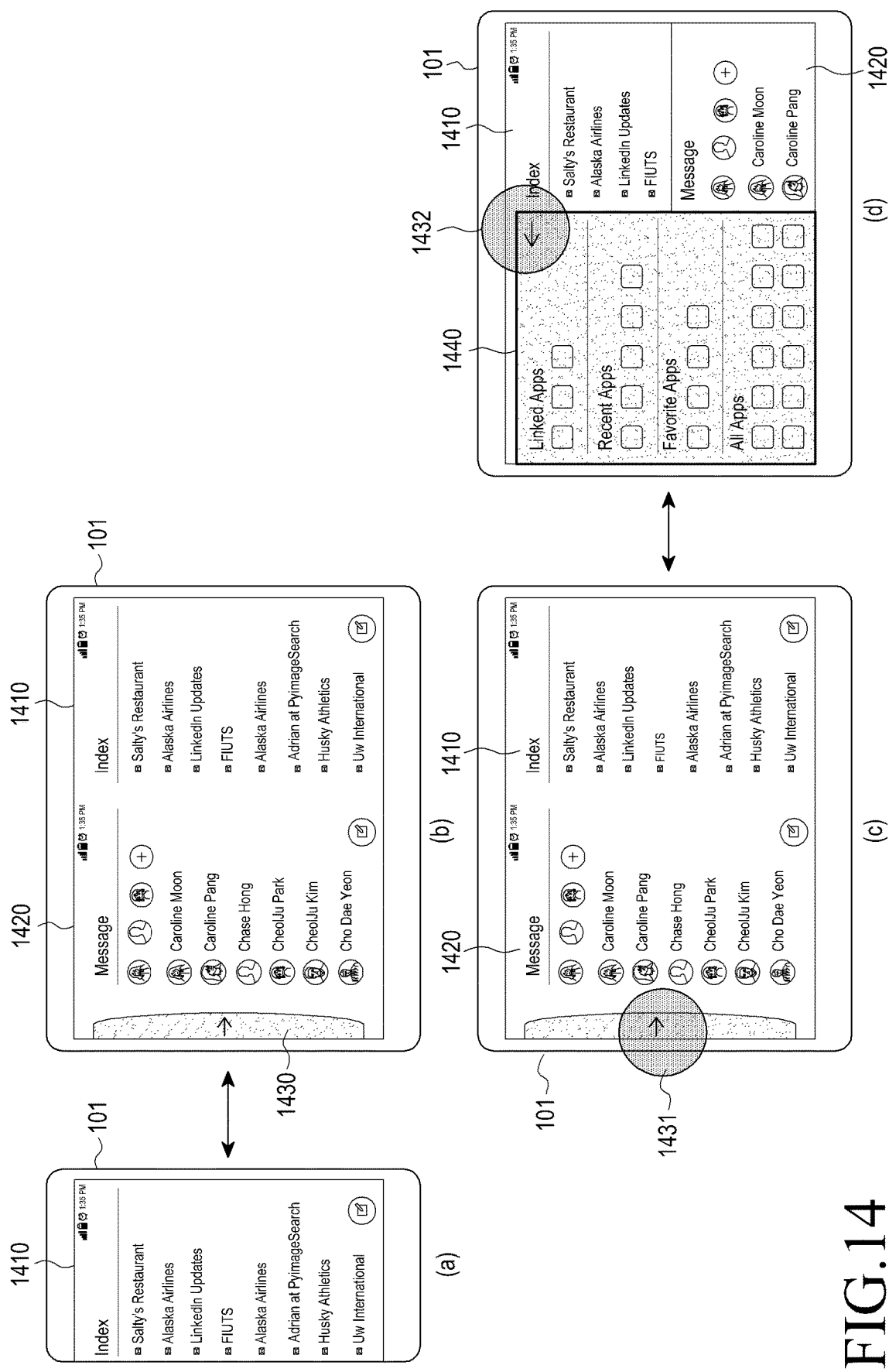
FIG. 14 illustrates that the display operation of a display is controlled by a shape change with an email application displayed in a first area on the display according to a first embodiment of the present disclosure.

(a) of FIG. 14 to (d) of FIG. 14 illustrate that the display operation of a display is controlled by a shape change with an email application displayed in a first area on the display according to a first embodiment of the present disclosure.

Referring to (a) to (d) of FIG. 14, an electronic device 101 may display the email application in the first area 1410 on a display 160. The electronic device 101 may display the email application in the first area 1410 on the display 160 with the display 160 folded. The electronic device 101 may detect a shape change (e.g., outspreading) with the email application displayed in the first area 1410 on the display 160. (b) of FIG. 14 shows that the display 160 is changed in shape. When the electronic device 101 detects an input to outspread the display 160 with the email application displayed in the first area 1410 on the display 160, the electronic device 101 may determine whether an application paired with the email application is already set. When there is an application (e.g., a texting application or a talk application) paired with the email application, the electronic device 101 may display the chat application (e.g., a texting application or a talk application) paired with the email application in a second area 1420 on the display 160. The electronic device 101 may display the chat application paired with the email application in the second area 1420 and may display a secondary screen in a third area 1430 while displaying the email application in the first area 1410. The secondary screen may be displayed on one side (e.g., boundary) of the display 160. The secondary screen may be displayed as an area for launching another application. The secondary screen may include an object of at least one chat application linked with a function of the email application and/or an object of each user included in each chat application. That is, the secondary screen may include at least one object corresponding to recommendation items customized for the email application. The secondary screen may be displayed in the second area by a drag gesture.

Referring to (c) of FIG. 14, when a touch or a gesture of dragging to the second area is sensed at a point (or area) 1431 in the third area 1430 where the secondary screen is displayed, the electronic device 101 may display various objects included in the secondary screen in the second area 1440. The secondary screen may include an object of at least one application linked with the email application, an object of at least one recently used application, and objects of all applications. The secondary screen may include an object of at least one application corresponding to recommended items customized for a function of the email application. In (d) of FIG. 14, when a touch or a gesture of dragging to the left (or the right) is sensed at a point (or area) 1432 on the secondary screen while displaying the various objects included in the secondary screen in the second area 1440, the electronic device 101 may display the secondary screen 1431 of (c) of FIG. 14 instead of the secondary screen 1440 shown in (d) of FIG. 14.

Figure 15:
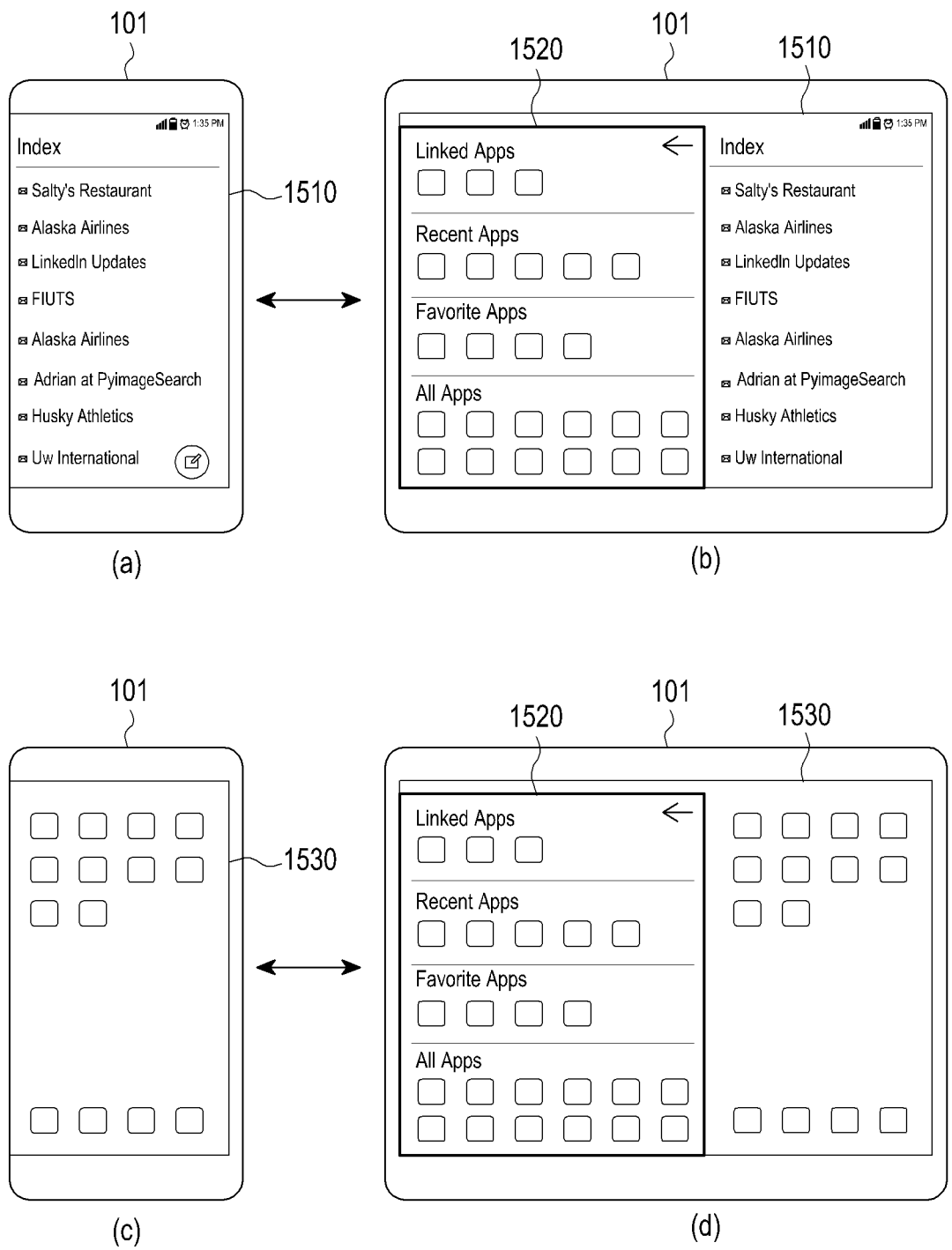
FIG. 15 illustrates that the display operation of a display is controlled by a shape change with an email application displayed in a first area on the display according to a second embodiment of the present disclosure.

(a) of FIG. 15 to (d) of FIG. 15 illustrate that the display operation of a display is controlled by outspreading with an email application displayed in a first area on the display according to a second embodiment of the present disclosure.

Referring to (a) of FIG. 15 and (b) of FIG. 15, an electronic device 101 may display an email application in a first area 1510 on a display 160. The electronic device 101 may display the email application in the first area 1510 on the display 160 with the display 160 folded. The electronic device 101 may detect a shape change (e.g., outspreading) with the email application displayed in the first area 1510 on the display 160. Then, the electronic device 101 may determine whether an application paired with the email application is already set. When there is an application paired with the email application with the email application displayed in the first area 1510 on the display 160, the electronic device 101 may display an object of at least one application paired with the email application, an object of at least one recently used application, and objects of all applications in a second area 1520 on the display 160 as shown in (b) of FIG. 15.

Referring to (c) of FIG. 15 and (d) of FIG. 15, the electronic device 101 may display a home screen in a first area 1530 on the display 160 with the display 160 folded. The electronic device 101 may detect a shape change (e.g., outspreading) with the home screen displayed in the first area 1530 on the display 160. Then, the electronic device 101 may determine whether an application paired with the home screen is already set. When there is an application paired with the home screen with the home screen displayed in the first area 1530 on the display 160, the electronic device 101 may display an object of at least one application paired with the home screen, an object of at least one recently used application, and objects of all applications in a second area 1520 on the display 160, as shown in (d) of FIG. 15.

(a) of FIG. 16 to (c) of FIG. 16 illustrate that the display operation of a display is controlled by a shape change with a screen indicating an incoming call displayed in a first area on the display according to a third embodiment of the present disclosure, and (d) of FIG. 16 to (f) of FIG. 16 illustrate that the display operation of a display is controlled by a shape change when there is an incoming call with an email application displayed in the first area on the display according to a fourth embodiment.

Referring to (a) of FIG. 16 to (c) of FIG. 16, an electronic device 101 may display a screen indicating an incoming call in a first area 1610 on a display 160. The electronic device 101 may display the screen indicating the incoming call in the first area 1510 on the display 160 with the display 160 folded. The electronic device 101 may detect a shape change (e.g., outspreading) with the screen indicating the incoming call displayed in the first area 1510 on the display 160. Then, the electronic device 101 may determine whether an application paired with the call is already set. When there is no application paired with the call with the screen indicating the incoming call displayed in the first area 1610 on the display 160, the electronic device 101 may determine whether the screen indicating the incoming call can be enlarged. When the screen indicating the incoming call cannot be enlarged, the electronic device 101 may display a secondary screen including an object of at least one application paired with the call, an object of at least one recently used application, an object of at least one user's favorite application, and objects of all applications in a second area 1620 on the display 160, as shown in (b) of FIG. 16. The object of the at least one application paired with the call, the object of the at least one recently used application, the object of the at least one user's favorite application, and the objects of all the applications may be displayed on the secondary screen according to priorities. The priorities may include the frequency of use, the recent usage order, and user settings. The objects of the at least one application may be displayed in the second area 1620 based on at least one priority from among the frequency of use, the recent usage order, and the user settings. When a touch or a gesture of dragging to the left (or the right) is sensed at a point (or area) on the secondary screen, the electronic device 101 may display the secondary screen 1620 in (c) of FIG. 16 instead of the secondary screen 1620 shown in (b) of FIG. 16. No object may be displayed in a second area 1630.

Referring to (d) of FIG. 16 to (f) of FIG. 16, the electronic device 101 may display an email application in a first area 1640 on the display 160. The electronic device 101 may display the email application 1640 in the first area on the display 160 with the display 160 folded. The electronic device 101 may display a screen 1650 indicating an incoming call in the first area with the email application 1640 displayed in the first area on the display 160. The electronic device 101 may detect a shape change (e.g., outspreading) of the display 160 while receiving the call. When the shape change (e.g., outspreading) of the display 160 is detected while receiving the call, the electronic device 101 may display the screen 1650 indicating the incoming call in the first area and may display the email application 1640 in the second area. The electronic device 101 may output a sound transmitted and received during the call through a speakerphone. Further, as illustrated in (f) of FIG. 16, the electronic device 101 may display a secondary screen including an object of at least one application paired with the call or the email application, an object of at least one recently used application, an object of at least one user's favorite application, and objects of all applications in a third area 1650 on the display 160.

(a) of FIG. 17 and (b) of FIG. 17 illustrate that the display operation of a display is controlled by a shape change with a map displayed in a first area on the display according to a fifth embodiment of the present disclosure.

Referring to (a) of FIG. 17 and (b) of FIG. 17, an electronic device 101 may display a map in a first area 1710 on a display 160. The electronic device 101 may display the map in the first area 1710 on the display 160 with the display 160 folded. The electronic device 101 may detect a shape change (e.g., outspreading) with the map displayed in the first area 1710 on the display 160. (b) of FIG. 17 shows that the display 160 is changed in shape (e.g., outspread). When the electronic device 101 detects an input to change the shape of the display 160 (e.g., input to outspread the display) with the map displayed in the first area 1710 on the display 160, the electronic device 101 may determine whether an application paired with an application displaying the map is already set. When there is no application paired with the application displaying the map, the electronic device 101 may determine whether the application displaying the map supports an expansion mode. When the application displaying the map supports an expansion mode, the electronic device 101 may determine whether the supported expansion mode is an area expansion mode. When the supported expansion mode is an area expansion mode, the electronic device may display the application displaying the map on the entire screen 1720 on the display 160. The electronic device 101 may display a secondary screen in a third area 1730. The secondary screen may be displayed on one side (e.g., a boundary) of the display 160. The secondary screen may be displayed as an area for launching another application. The secondary screen may include an object of at least one application linked with a function of the application displaying the map.

(a) of FIG. 18 to (d) of FIG. 18 illustrate that the display operation of a display is controlled by a shape change with a contact information application displayed in a first area on the display according to a sixth embodiment of the present disclosure.

Referring to (a) of FIG. 18 to (d) of FIG. 18, an electronic device 101 may display a contact information application in a first area 1810 on a display 160. The electronic device 101 may display the contact information application in the first area 1810 on the display 160 with the display 160 folded. The electronic device 101 may detect a shape change (e.g., outspreading) with the contact information application displayed in the first area 1810 on the display 160. (b) of FIG. 14 shows that the display 160 is changed in shape (e.g., outspread). When the electronic device 101 detects an input to outspread the display 160 with the contact information application displayed in the first area 1410 on the display 160, the electronic device 101 may determine whether an application paired with the contact information application is already set. When there is no application paired with the contact information application, the electronic device 101 may determine whether the contact information application supports an expansion mode. When the contact information application supports an expansion mode, the electronic device 101 may determine whether the expansion mode supported by the contact information application is an area expansion mode. When the expansion mode supported by the contact information application is not an area expansion mode, the electronic device 101 may display an additional function associated with the contact information application in a second area 1820. The additional function may be different depending on the attributes of the application displayed in the first area 1810. For example, the function associated with the contact information application may include a call history 1821 and a messenger history 1822. When the call history 1821 is selected, the electronic device 101 may display recent calls 1831, favorites 1832, and contacts 1833 in a second area 1840, and may display a keypad 1834 in the first area 1810, as in (c) of FIG. 18. When the messenger history 1822 is selected, the electronic device 101 may display an important sender 1841, important mail 1842, and a sent items folder 1843 in the second area 1840 and may display an email list 1844 in the first area 1810, as in (d) of FIG. 18. Further, the electronic device 101 may display a secondary screen in a third area 1830. The secondary screen may be displayed on one side (e.g., boundary)

of the display 160. The secondary screen may be displayed as an area for launching another application. The secondary screen may include an object of at least one application linked with a function of the contact information application.

(a) of FIG. 19A and (b) of FIG. 19A illustrate that the display operation of a display is controlled by a shape change with a search result displayed by inputting a keyword that the user desires to retrieve through a web browser displayed in a first area on the display according to a seventh embodiment of the present disclosure; (c) of FIG. 19A and (d) of FIG. 19A illustrate that the display operation of a display is controlled by a shape change with a video played in a first area on the display according to an eighth embodiment of the present disclosure; (e) of FIG. 19B and (f) of FIG. 19B illustrate that the display operation of a display is controlled by a shape change with a chat application displayed in a first area on the display according to a ninth embodiment of the present disclosure; and (g) of FIG. 19B and (h) of FIG. 19B illustrate that the display operation of a display is controlled by a shape change with a home screen displayed in a first area on the display according to a tenth embodiment of the present disclosure.

Referring to (a) of FIG. 19A and (b) of FIG. 19A, an electronic device 101 may display a web browser in a first area 1910 on a display 160. The electronic device 101 may display the web browser in the first area 1910 on the display 160 with the display 160 folded. The electronic device 101 may display a result corresponding to a keyword input through the web browser in the first area 1910. The electronic device 101 may detect a shape change (e.g., outspreading) with the search result through the web browser displayed in the first area 1910 on the display 160. (b) of FIG. 19A shows that the display 160 is changed in shape (e.g., outspread). When the electronic device 101 detects an input to change the shape of the display 160 with the web browser displayed in the first area 1910 on the display 160, the electronic device 101 may determine whether an application paired with the web browser is already set. When there is no application paired with the web browser, the electronic device 101 may determine whether the web browser supports an expansion mode. When the web browser supports an expansion mode, the electronic device 101 may determine whether the supported expansion mode is an area expansion mode. When the supported expansion mode is not an area expansion mode, the electronic device 101 may display the result of an additional search, other than the displayed search result, in a second area 1920. When the shape change is detected with the search result through the web browser displayed in the first area 1910 on the display 160, the electronic device 101 may display the result of the additional search, other than the displayed search result, in the second area 1920.

Referring to (c) of FIG. 19A and (d) of FIG. 19A, the electronic device 101 may display a playing video in a first area 1940 on the display 160. The electronic device 101 may display the playing video in the first area 1940 on the display 160 with the display 160 folded. The electronic device 101 may detect a shape change (e.g., outspreading) with the video displayed in the first area 1940 on the display 160. (d) of FIG. 19A shows that the display 160 is outspread. When the electronic device 101 detects an input to outspread the display 160 with the playing video displayed in the first area 1940 on the display 160, the electronic device 101 may determine whether an application paired with an application playing the video is already set. When there is no application paired with the application playing the video, the electronic device 101 may determine whether the application playing the video supports an expansion mode. When the application playing the video supports an expansion mode, the electronic device 101 may determine whether the supported expansion mode is an area expansion mode. When the supported expansion mode is not an area expansion mode, the electronic device 101 may display the screen of the playing video that is magnified 1950 by a predetermined multiple, as in (d) of FIG. 19A. Further, the electronic device 101 may display a menu button 1951 to select at least one function provided by the application displaying the video on the display 160. The electronic device 101 may display a secondary screen in a third area 1960. The secondary screen may be displayed on one side (e.g., a boundary) of the display 160. The secondary screen may be displayed as an area for launching another application. The secondary screen may include an object of at least one application linked with a function of the application playing the video. That is, the secondary screen may include at least one object corresponding to recommendation items customized for the application playing the video.

Referring to (e) of FIG. 19B and (f) of FIG. 19B, the electronic device 101 may display a chat application in a first area 1970 on the display 160. The electronic device 101 may display the chat application in the first area 1970 on the display 160 with the display 160 folded. The electronic device 101 may detect outspreading with the chat application displayed in the first area 1970 on the display 160. The electronic device 101 may determine whether an application paired with the chat application is already set. When there is no application paired with the chat application with the chat application displayed in the first area 1970 on the display 160, the electronic device 101 may determine whether the chat application supports an expansion mode. When the chat application supports an expansion mode, the electronic device 101 may determine whether the supported expansion mode is an area expansion mode. When the supported expansion mode is not an area expansion mode, the electronic device 101 may display a secondary screen including an object of at least one application linked with the chat application, an object of at least one recently used application, and a plurality of emoticons applicable to the chat application in a second area 1981, as in (f) of FIG. 19B. The secondary screen may include an object of at least one application corresponding to recommended items customized for a function of the chat application.

Referring to (g) of FIG. 19B and (h) of FIG. 19B, the electronic device 101 may display a home screen in a first area 1990 on the display 160. The electronic device 101 may display the home screen in the first area 1979 on the display 160 with the display 160 folded. The electronic device 101 may detect a shape change (e.g., outspreading) with the home screen displayed in the first area 1990 on the display 160. The electronic device 101 may determine whether an application paired with the home screen is already set. When there is no application paired with the home screen with the home screen displayed in the first area 1970 on the display 160, the electronic device 101 may determine whether the home screen supports an expansion mode. When the home screen supports an expansion mode, the electronic device 101 may determine whether the supported expansion mode is an area expansion mode. When the supported expansion mode is not an area expansion mode, the electronic device 101 may display a secondary screen including an object of at least one application linked with the home screen in a second area 1991, as in (h) of FIG. 19B. The secondary screen may include an object of at least one application corresponding to recommended items customized for a function of the home screen. The secondary screen may be displayed on one side (e.g., a boundary) of the display 160. The secondary screen may include an object of at least one application linked with a function of the home screen. The secondary screen may include at least one object corresponding to recommended items customized for the home screen.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. According to various embodiments, a storage medium may store commands, wherein, for a computer-readable storage medium that stores a program including an instruction to control a display of an electronic device, the commands may include: a first command set to display a first application in a first area on a display; a second command set to detect a shape change of the display; a third command set to determine a second application, paired with the first application displayed in the first area, in response to the detection; and a fourth command set to display the determined second application in a second area on the display.

The embodiments of this document disclosed in the present specification and the drawings are provided as specific examples only to easily describe the technical content of this document and to enhance understanding of this document, and are not intended to limit the scope of this document. Therefore, all changes or modifications derived from the technical idea of the present disclosure as well as the embodiments described herein should be interpreted to belong to the scope of the present disclosure.

The invention claimed is:

1. An electronic device for controlling a display, the electronic device comprising:
a display configured to display a first application in a first area; and
a processor configured to:
detect a shape change of the display,
display a second application, paired with the first application displayed in the first area, in a second area on the display in response to the detection, and
determine whether the first application supports an expansion mode in response to determining that there is no second application paired with the first application.

2. The electronic device of claim 1, further comprising a sensor unit configured to detect outspreading or folding of the electronic device.

3. The electronic device of claim 1, wherein the processor is configured to determine whether the second application, linked with a function of the first application, is set in response to the detected shape change.

4. The electronic device of claim 3, wherein, when the second application is set, the processor is configured to display the second application in the second area and to display a secondary screen in a third area on the display.

5. The electronic device of claim 4, wherein the processor is configured to display the secondary screen on one side of the display.

6. The electronic device of claim 5, wherein:
the processor is configured to:
split the first area into a first sub-area and a second sub-area upon detecting an input on the secondary screen,
display the first application in the first sub-area,
display the second application in the second sub-area, and
display the secondary screen in the second area, and
the secondary screen displayed in the second area comprises an object of at least one application linked with the function of the first application.

7. The electronic device of claim 3, wherein:
the processor is configured to display a secondary screen in the second area when the first application does not support the expansion mode, and
the secondary screen comprises an object of at least one application linked with the function of the first application.

8. The electronic device of claim 3, wherein, when the first application supports the expansion mode, the processor is configured to determine whether the supported expansion mode is an area expansion mode.

9. The electronic device of claim 8, wherein, when the expansion mode is the area expansion mode, the processor is configured to enlarge the first application to be displayed in the first area and the second area and to display a secondary screen in a third area on the display.

10. The electronic device of claim 8, wherein, when the expansion mode is not the area expansion mode, the processor is configured to display an additional function or additional information associated with the first application in the second area and to display a secondary screen in a third area on the display.

11. The electronic device of claim 1, wherein, when it is detected that the display is folded after the display is outspread by the shape change, the processor is configured to deactivate the second area.

12. The electronic device of claim 1, wherein:
the processor is configured to display a secondary screen in a third area on the display in response to the detected shape change, and
the secondary screen comprises at least one object corresponding to recommended items customized for the first application.

13. A method for controlling a display by an electronic device, the method comprising:
displaying a first application in a first area on a display;
detecting a shape change of the display;
determining whether a second application is paired with the first application displayed in the first area, in response to the detection;
displaying the second application in a second area on the display in response to determining the second application is paired with the first application; and
determining whether the first application supports an expansion mode in response to determining that there is no second application paired with the first application.

14. The method of claim 13, further comprising:
determining whether the second application, linked with a function of the first application, is set in response to the detected shape change;
displaying the second application in the second area when the second application is set; and
displaying a secondary screen in a third area on the display.

* * * * *